(12) United States Patent
Gelov

(10) Patent No.: US 9,623,601 B2
(45) Date of Patent: Apr. 18, 2017

(54) METHOD AND APPARATUS FOR FORMING BLOW MOLDED VESSELS

(71) Applicant: HEARTLAND SWEETENERS, LLC, Carmel, IN (US)

(72) Inventor: Teodor H. Gelov, Carmel, IN (US)

(73) Assignee: Heartland Consumer Products, LLC, Carmel, IN (US)

(*) Notice: Subject to any disclaimer, the term of this patent is extended or adjusted under 35 U.S.C. 154(b) by 0 days.

(21) Appl. No.: 14/507,767

(22) Filed: Oct. 6, 2014

(65) Prior Publication Data
US 2015/0096996 A1    Apr. 9, 2015

Related U.S. Application Data

(60) Provisional application No. 61/887,242, filed on Oct. 4, 2013.

(51) Int. Cl.

| | | |
|---|---|---|
| *B29C 49/60* | (2006.01) | |
| *B29C 49/04* | (2006.01) | |
| *B29C 49/06* | (2006.01) | |
| *B65D 43/16* | (2006.01) | |
| B65D 1/02 | (2006.01) | |
| B29K 101/12 | (2006.01) | |
| B29K 105/00 | (2006.01) | |
| B29L 31/00 | (2006.01) | |
| B65D 23/10 | (2006.01) | |
| B65D 47/08 | (2006.01) | |
| B65D 47/20 | (2006.01) | |

(52) U.S. Cl.
CPC .............. *B29C 49/60* (2013.01); *B29C 49/04* (2013.01); *B29C 49/06* (2013.01); *B65D 43/166* (2013.01); B29C 2049/6009 (2013.01); B29K 2101/12 (2013.01); B29K 2105/258 (2013.01); B29L 2031/7158 (2013.01); B65D 1/0246 (2013.01); B65D 23/102 (2013.01); B65D 47/0814 (2013.01); B65D 47/2018 (2013.01)

(58) Field of Classification Search
None
See application file for complete search history.

(56) References Cited

U.S. PATENT DOCUMENTS 3,369,272 A    2/1968    Martin, Jr. et al.
3,482,815 A    12/1969    Naturale
(Continued)

OTHER PUBLICATIONS http://blowmold.velocityes.com/neck-tooling/standard-flow-bottom-load-blow-pin-bodies/.

*Primary Examiner* — Monica Huson
(74) *Attorney, Agent, or Firm* — Benesch, Friedlander, Coplan & Aronoff LLP

(57) ABSTRACT

Methods and apparatus for molding a vessel, such as a bottle, with a high quality sealing surface are described herein. In one embodiment, a stepped blow pin can be used to form the sealing surface of a bottle. A stepped blow pin can include a body with a distal end and a proximal end. The blow pin can include a first region that includes a first diameter and a first engagement surface. The blow pin can further include a second region that includes a second diameter. The second region can be positioned between the first region and the distal end. A transition section can be positioned between the first region and second region. The blow pin can also include a top surface position at the proximal end, and a bottom surface positioned at the distal end.

11 Claims, 36 Drawing Sheets

(56) References Cited

U.S. PATENT DOCUMENTS

| | | |
|---|---|---|
| 3,629,385 A | 12/1971 | Badavas et al. |
| 3,632,264 A | 1/1972 | Butcher |
| 3,806,300 A * | 4/1974 | Hafele .................... B29C 49/76 425/525 |
| 3,816,046 A * | 6/1974 | Farrell .................... B29C 49/58 425/389 |
| 3,819,317 A | 6/1974 | Higginbotham |
| 4,187,070 A | 2/1980 | Martin, Jr. |
| 4,375,947 A | 3/1983 | Marcus |
| 4,397,629 A | 8/1983 | Akutsu et al. |
| 4,578,028 A | 3/1986 | Dirksing et al. |
| 4,631,020 A | 12/1986 | Frankenberg et al. |
| 4,753,591 A | 6/1988 | Maes et al. |
| 5,629,032 A | 5/1997 | Pennino |
| 6,824,732 B2 | 11/2004 | Cobiski et al. |
| 7,690,914 B1 | 4/2010 | Clack |
| 8,038,433 B2 | 10/2011 | Cullison et al. |
| 2006/0165839 A1 | 7/2006 | Wohlgemuth et al. |
| 2008/0011779 A1 | 1/2008 | Klima et al. |
| 2010/0227119 A1 | 9/2010 | Taha et al. |
| 2012/0055862 A1 | 3/2012 | Parekh et al. |
| 2012/0193838 A1 | 8/2012 | Bock et al. |

\* cited by examiner

METHOD AND APPARATUS FOR FORMING BLOW MOLDED VESSELS

CROSS-REFERENCE TO RELATED APPLICATIONS

This application claims priority to U.S. Provisional Patent Application No. 61/887,242, titled "Method and Apparatus for Forming Blow Molded Vessels," which was filed on Oct. 4, 2013, and which is expressly incorporated by reference herein in its entirety.

TECHNICAL FIELD

The disclosed material relates generally to forming vessels through a blow molding process or otherwise forming vessels with a controlled sealing area. More particularly the disclosed material related to using a stepped blow pin, core pin, or other device in a blow molding process to form a vessel with a defect free sealing areas that includes a raised region.

BACKGROUND

Blow molding processes are commonly used to form hollow, thin-walled vessels such as bottles, drums, storage tanks, and other such containers that include a hollow inner chamber capable of containing and storing liquids or other substances. Generally, blow molding processes employ air pressure to expand a heated plastic tube known as a parison located inside a mold cavity. The inner surfaces of the mold cavity are generally designed to form the shape and contours of the outer surfaces of the vessel being molded. Air pressure is applied to expand the plastic parison until the parison conforms to the inner walls of the mold. The plastic cools and hardens against the mold cavity resulting in the desired vessel. Because vessels are typically designed to contain liquids or other substances, blow molded vessels commonly include an opening through which liquids or other substances can be poured into and out of the vessel. Such openings are often formed at the end of a necked portion of the vessel and provide access to the hollow chamber within the vessel. The necked portion can be arranged to accommodate a cap or other such component that can be removed or adjusted to gain access to the hollow chamber and replaced again to seal the opening of the vessel.

Examples of hollow thin-walled vessels formed by blow molding processes include bottles used for consumer products such as bottled water, liquid soap, shampoo, milk, and many other liquids. Because liquids can seep, run or otherwise move through small gaps or pathways caused by defects or flaws in sealing surfaces, it can be important that the sealing surfaces between the blow molded vessel and any cap or enclosing component be generally free from such defects and flaws that can cause gaps or pathways. If gaps and pathways through which liquids or vapors can travel (vapors can be stored in a vessel or can be generated, for example, by evaporation or vaporization of liquids contained within vessels) are present in the sealing surfaces between a vessel and its cap, the blow molded vessel may experience leaking issues that limit the effectiveness or usefulness of the vessel.

Blow molding processes are commonly used to form vessels because such processes offer the flexibility to make plastic, hollow, thin-walled vessels in a variety of shapes and sizes. Many different thermoplastic polymers can be used to blow mold vessels such as, for example, polyethylene, polypropylene, polyethylene terephtalate (also known as PET), and polyvinyl chloride (also known as PVC). Such thermoplastics in the form of small pellets or granules are typically heated until the thermoplastic is molten and further processed to form the parison.

Different techniques can be used to blow mold a vessel. Certain processes differ in how the parison is formed. For example "extrusion blow molding" employs an extruder with a rotating screw to push molten plastic through a die head to form the parison. The parison is extruded vertically so that gravity carries it down and positions the parison between two open mold halves positioned below the extruder. In one variation, the parison can be extruded around a blow pin that is already positioned within the open mold. The mold can be closed about the parison and blow pin to clamp the parison and blow pin into place. A gas, typically air, can be injected through the blow pin to expand the parison until the plastic forms the shape determined by the mold cavity. In another variation, the parison is extruded between the two open mold halves, the mold halves are closed about the parison, and the blow pin is pushed through an opening in the mold to engage with the parison. Air is injected into the parison through the blow pin, and the parison expands until it engages the inner surfaces of the mold to form the shape of the mold.

Extrusion blow molding tooling is relatively inexpensive and can be used for mass production of products. For example, extrusion blow molding can be used to manufacture large quantities of bottles for use in the sale of consumer goods. However, extrusion blow molding can produce vessels with dimensional variations, especially for inner surfaces of the vessel. This is to say that although extrusion blow molding is inexpensive and efficient, it may not be reliable enough if tight internal dimensional tolerances are required for a product. Therefore, when considering extrusion blow molding as a manufacturing process, the overall product design and the required tolerances need to be considered.

Another blow molding method is known as "injection blow molding." In injection blow molding, a core pin is positioned within the cavity of a first mold. Molten plastic is injected around the core pin and into the cavity and cooled to form a solidified "preform." The core pin and cavity are typically designed to form a preform that includes a neck portion on one end of the preform and a parison portion extending from the neck. The neck portion is more precisely formed because it is formed between the rigid surfaces of the mold cavity and the core pin. Likewise, the thickness of the walls of the parison portion are also more precisely formed between the rigid surfaces of the mold cavity and the core. The preform can be stored for later use or can be used immediately to form a vessel. When the preform is used to form a vessel, a blow molding process is used to form the parison into the body of the vessel. The preform can be positioned in a second mold with the neck portion clamped in the mold and the parison portion extending into the mold cavity. The mold and the neck portion can be arranged so that the neck portion is protected against any deformation due to pressure of elevated temperature of the mold. A blow pin can be positioned within the interior of the neck portion, and the parison portion of the preform can be heated. Air can be moved into the heated parison through the blow pin and the heated parison portion expands until the plastic forms a product based on the shape of the cavity of the mold. As compared to extrusion blow molding, injection blow molding can typically form more dimensionally precise and accurate components.

There is a need in the industry to develop innovative tooling and processes that form vessels that effectively seal difficult to seal products or combine the efficiency of extrusion blow molding with the dimensional precision of injection blow molding.

SUMMARY

Methods and apparatus for molding a vessel, such as a bottle, with a high quality sealing surface are described herein. In one embodiment, a stepped blow pin can be used to form the sealing surface of a bottle. A stepped blow pin can include a body with a distal end and a proximal end. The blow pin can include a first region that includes a first diameter and a first engagement surface. The blow pin can further include a second region that includes a second diameter. The second region can be positioned between the first region and the distal end. A transition section can be positioned between the first region and second region. The blow pin can also include a top surface position at the proximal end, and a bottom surface positioned at the distal end.

In another embodiment, the features of the blow pin can be provided in a core pin used to injection mold a neck portion of a preform. The preform can then be blow molded to form a bottle, where the neck portion remains substantially unchanged from its formation during injection molding using the core pin.

In another embodiment, a method is provided for forming a vessel with a high quality sealing surface using a blow molding process. The method can include the step of providing a mold, where the mold includes a first mold body with a first cavity, a first molding surface, and a first neck forming region, and a second mold body with a second cavity, a second molding surface, and a second neck forming region. The method can further include the steps of providing a plastic material and providing a pin. The pin can include a body with a distal end and a proximal end, a channel passing through the pin from the distal end to the proximal end, a first region with a first diameter, a second region with a second diameter, a first transition positioned between the first region and second region, a top surface position at the proximal end, and a bottom surface at the distal end. The first region can include a first engagement surface, and the second region can be positioned between the first region and the distal end. The method further includes the steps of positioning the plastic material within the mold, inserting the pin into the plastic material, engaging the plastic material with the first molding surface and second molding surface, cooling the mold to solidify the plastic material, and remove the solidified plastic material from the mold. The first engagement surface can be positioned proximate to the first neck forming region and second neck forming region.

In another embodiment, a vessel includes a bottle and a cap. The bottle includes an inner chamber for storing materials, a neck portion, and a neck sealing surface. The neck can also include a first opening providing access to the inner chamber and a second opening providing access to the environment surrounding the vessel. The neck sealing surface can be positioned between the first opening and second opening. The cap can be arranged to be secured to the neck portion and includes a cap sealing surface. The cap sealing surface engages the neck sealing surface when the cap is secured to the neck portion of the bottle. The neck also includes a raised region of the neck sealing surface that engages with the cap sealing surface. The inner diameter of the raised region is less than a general inner diameter of the neck sealing surface.

BRIEF DESCRIPTION OF THE DRAWINGS

Objects and advantages together with the operation of the invention may be better understood by reference to the detailed description taken in connection with the following illustrations, wherein.

DETAILED DESCRIPTION

The apparatuses and methods disclosed in this document are described in detail by way of examples and with reference to the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be and should not be construed as mandatory or limiting unless specifically designated as such. Selected examples of apparatuses and methods for forming a vessel with a high quality sealing surface using a blow molding process are hereinafter disclosed and described in detail with reference made to FIGS. 1-36.

Described and disclosed herein are novel methods and apparatus for forming blow molded vessels that limit or otherwise minimize leakage of liquids stored in said blow molded vessels. FIGS. 1-9 illustrate exemplary extrusion blow molding processes for forming a vessel such as a bottle for containing liquids. As will be further described, novel blow pins can be used in a novel extrusion molding process to form novel vessels that limit leakage of liquids stored in such molded vessels.

Figure 1:
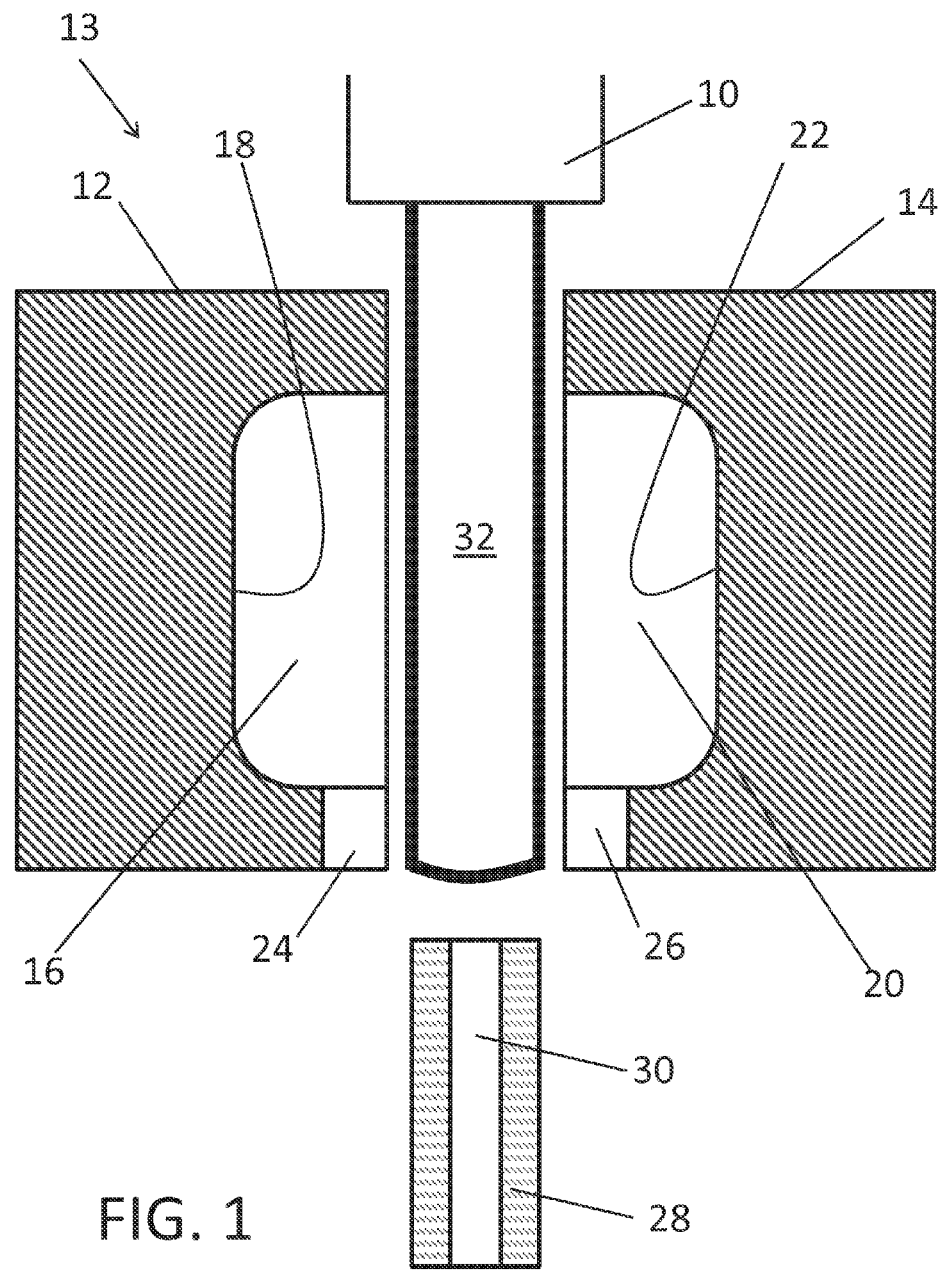
FIG. 1 is a schematic illustration of a step of an exemplary extrusion blow molding process.

FIG. 1 illustrates an extrusion die 10 of an extrusion molding apparatus (not shown), a first mold body 12 and a second mold body 14. The first mold body 12 and second mold body 14 collectively form a mold 13. The first mold body 12 includes a first cavity 16 and a first molding surface 18. The second mold body includes a second cavity 20, designed to align or mate with the first cavity 16, and a second molding surface 22. The first mold body 12 and the second mold body 14 can be configured and arranged to facilitate the blow molding of a vessel for storing materials. In one embodiment, the vessel can be a bottle, which will be further described in detail herein. A blow molded bottle can include a neck with an opening to facilitate access to the bottle. The first cavity 16 includes a first neck forming region 24, and the second cavity 20 includes a second neck forming region 26. A blow pin 28 that includes an air passage 30 is provided to facilitate the extrusion blow molding of the bottle. Various novel arrangements of blow pins will be described herein that include features that can be used to form novel vessels. The first neck forming region 24, the second neck forming region 26, and the blow pin 28 can interact cooperatively to form the neck of the bottle.

Figure 2:
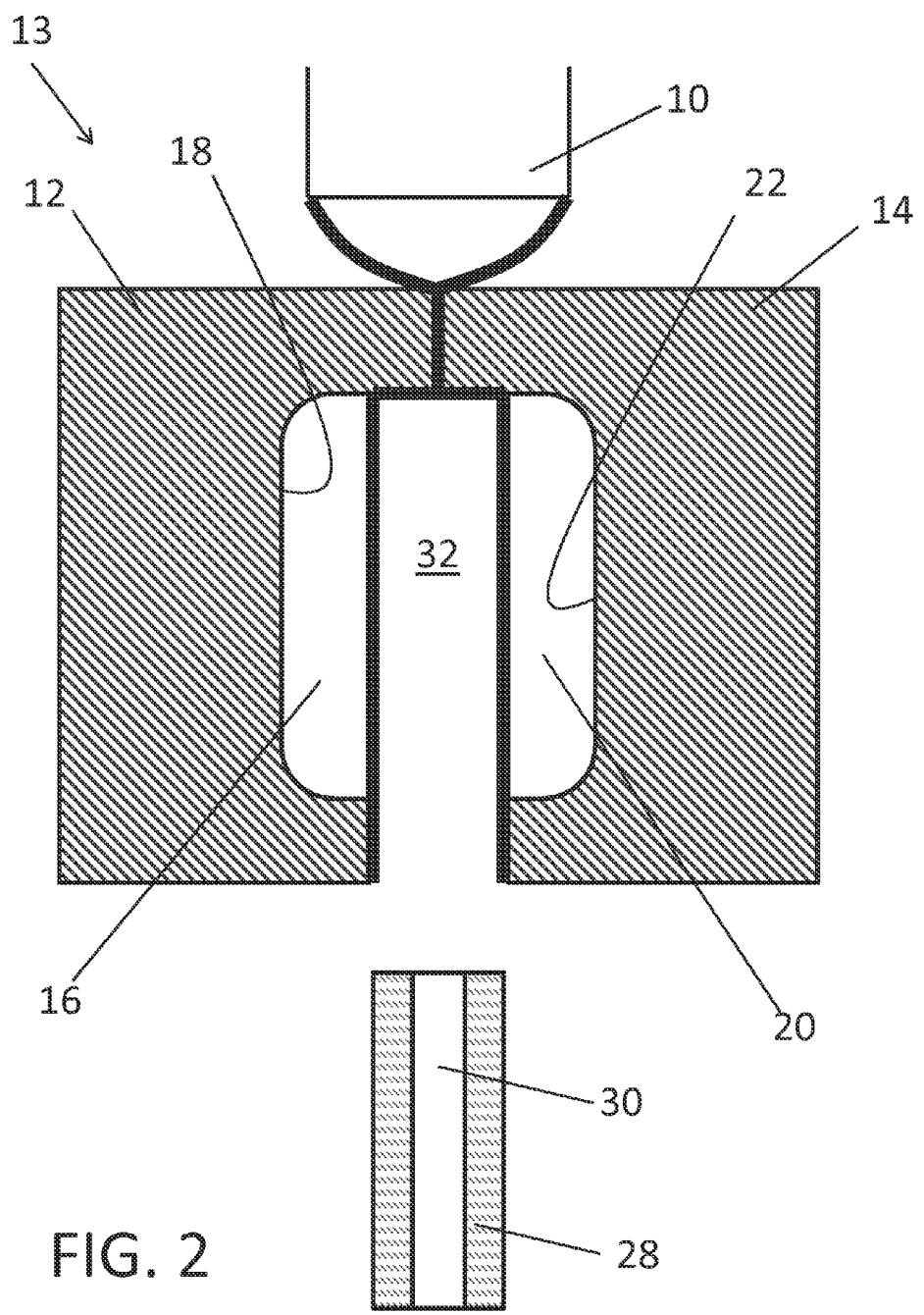
FIG. 2 is a schematic illustration of another step of an exemplary extrusion blow molding process.
Figure 3:
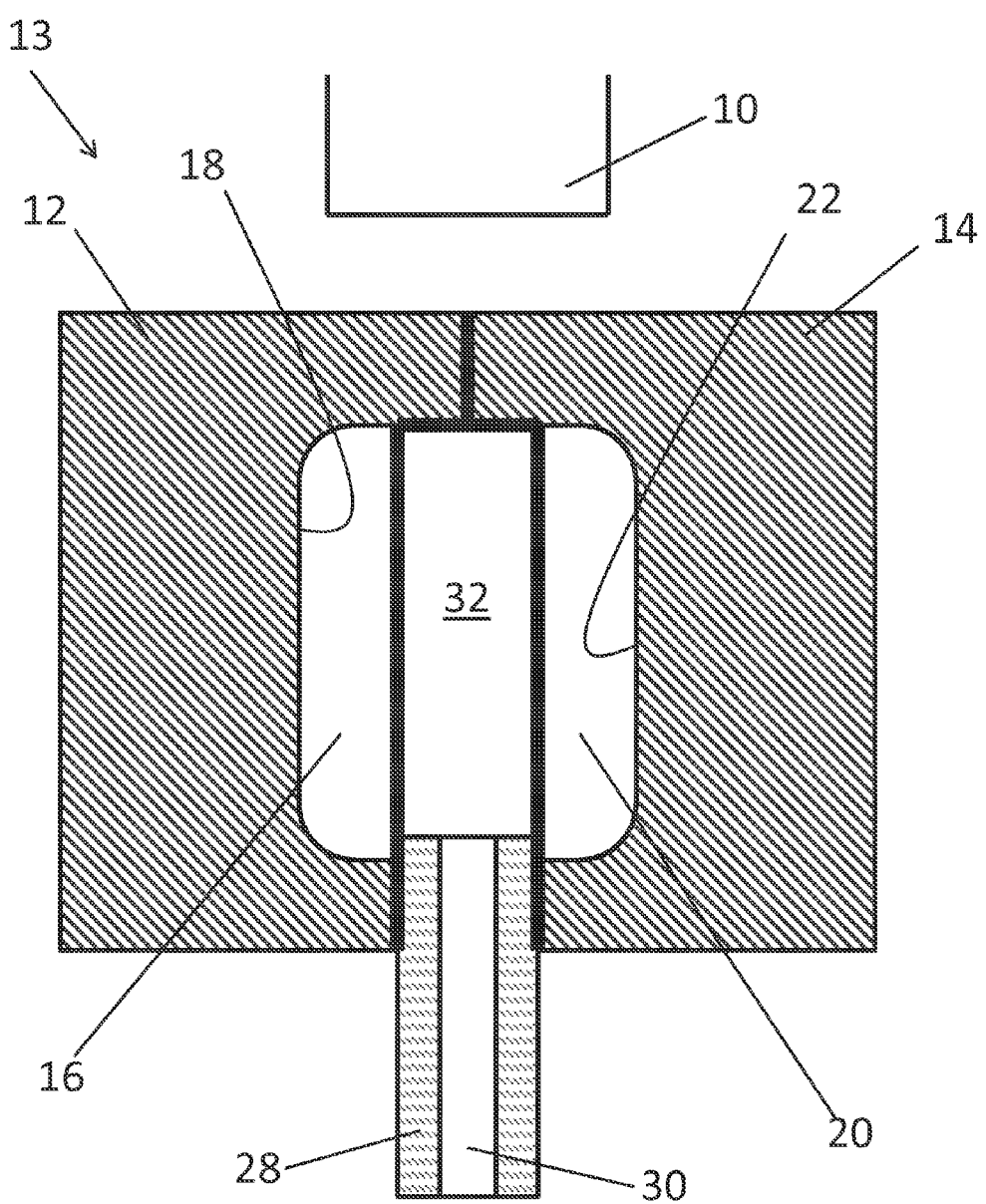
FIG. 3 is a schematic illustration of another step of an exemplary extrusion blow molding process.

Polymers, typically in the form of pellets or granules, are heated and melted by the extrusion molding apparatus and moved toward the extrusion die 10 by a screw. The screw forces the molten polymer through the extrusion die 10 to form a parison 32. As illustrated in FIG. 1, the parison 32 exits the extrusion die 10 and descends due to gravity into an opening between the first mold body 12 and second mold body 14. As illustrated by FIG. 2, the first mold body 12 and the second mold body 14 can be moved together to close the mold 13 and clamp the parison 32 between the first mold body 12 and the second mold body 14. The first mold body 12 and the second mold body 14 pinch off the parison 32 below the extrusion die 10, and the first neck forming region 24 and second neck forming region 26 engage the parison 32 and provide an opening above the blow pin 28. As illustrated in FIG. 3, the blow pin 28 can be moved upward into the opening formed by the first neck forming region 24 and second neck forming region 26 so that a portion of the parison 32 is positioned between the blow pin 28 and the first mold body 12 and the second mold body 14. As will be described in detail herein, the portion of the parison 32 positioned between the blow pin 28 and the first mold body 12 and the second mold body 14 can form the neck of the extrusion blow molded bottle.

Figure 4:
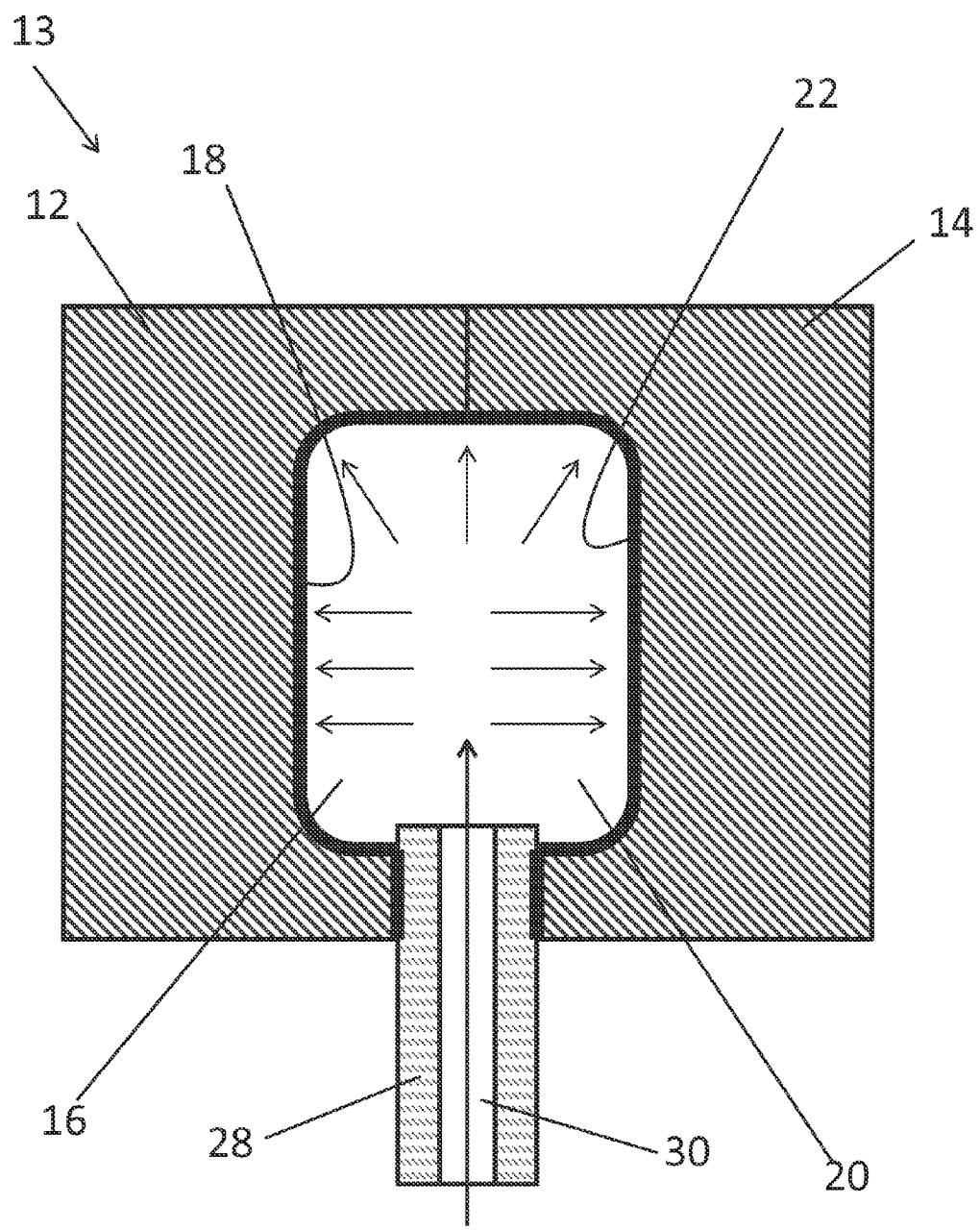
FIG. 4 is a schematic illustration of another step of an exemplary extrusion blow molding process.

As illustrated in FIG. 4, air can be injected into the parison 32 through the air passage 30 in the blow pin 28 to pressurize the interior of the parison 32 (air flow and pressure are represented by arrows within air passage 30 and parison 32). The parison 32 inflates and expands until the parison 32 engages with the first molding surface 18 and second molding surface 22 of the mold 13. The mold 13 is typically cooled so that the plastic of the parison 32 solidifies, hardens, and takes on the shape and the contours of the mold 13, resulting in a bottle. The forming of the neck portion of the bottle can be assisted by a compression force applied to the parison by the blow pin 28 and the walls of the first neck forming region 24 and second neck forming region 26.

Figure 5:
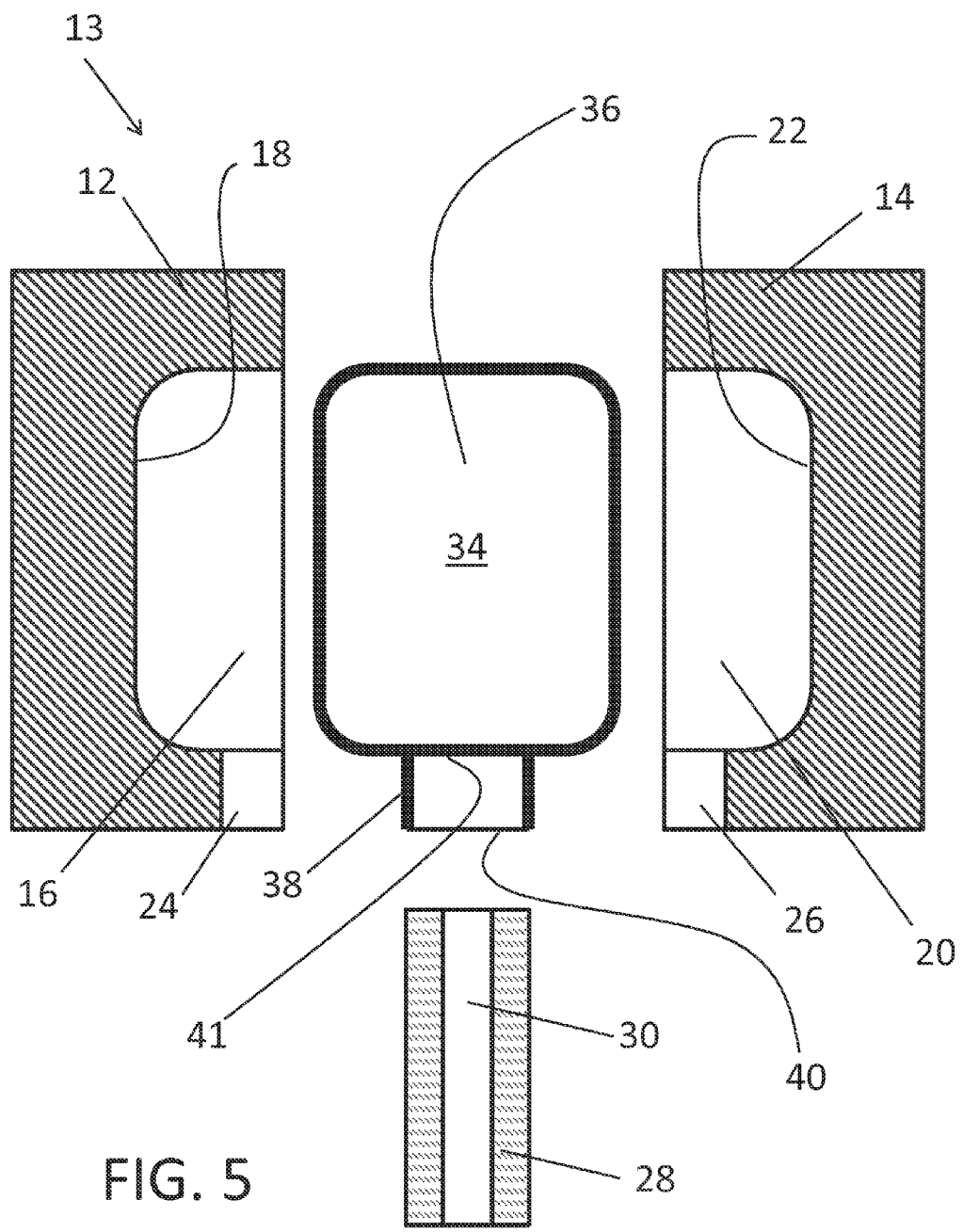
FIG. 5 is a schematic illustration of another step of an exemplary extrusion blow molding process.

As illustrated in FIG. 5, the mold 13 can be opened by moving the first mold body 12 and second mold body 14 apart, and the blow pin 28 can be moved downward, leaving a formed bottle 34. The bottle 34 can include an internal chamber 36 for containing liquids or other materials and a neck portion 38 to facilitate access to the inner chamber 36. The neck portion 38 includes a first opening 40 at the top of the neck portion 38 that generally provides access to the bottle 34 from the surrounding environment, and a second opening 41 at the bottom of the neck portion 38 that provides access to the internal chamber 36 of the bottle 34.

Figure 6:
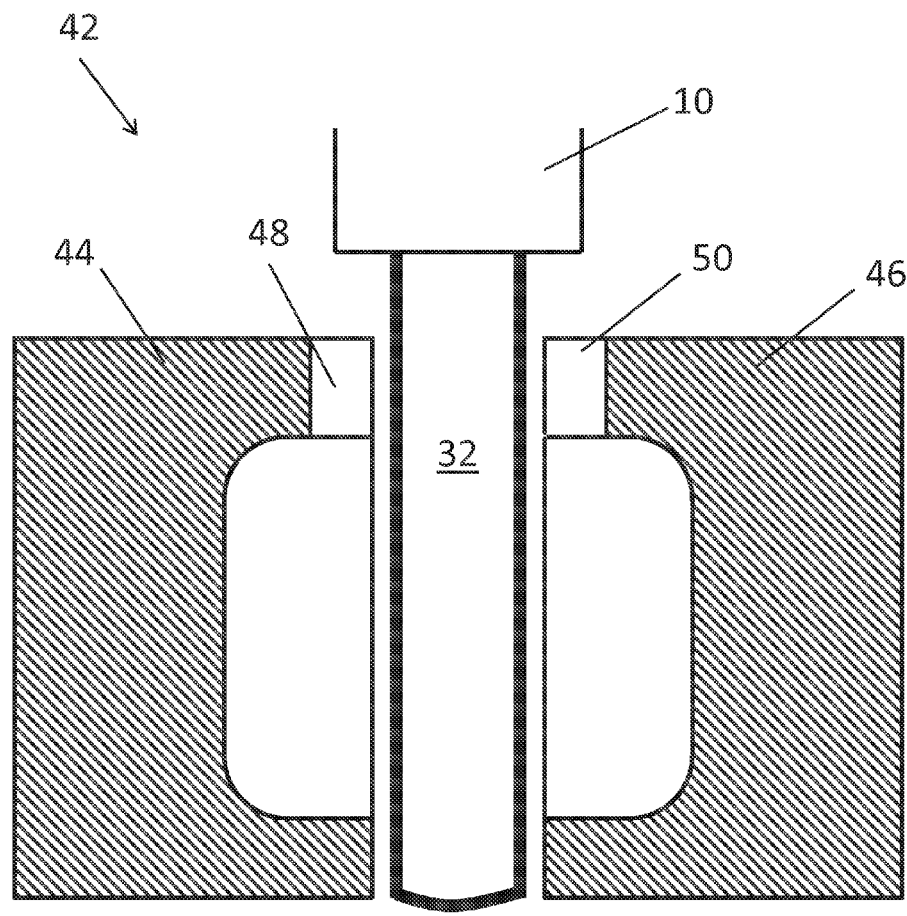
FIG. 6 is a schematic illustration of another step of an exemplary extrusion blow molding process.
Figure 7:
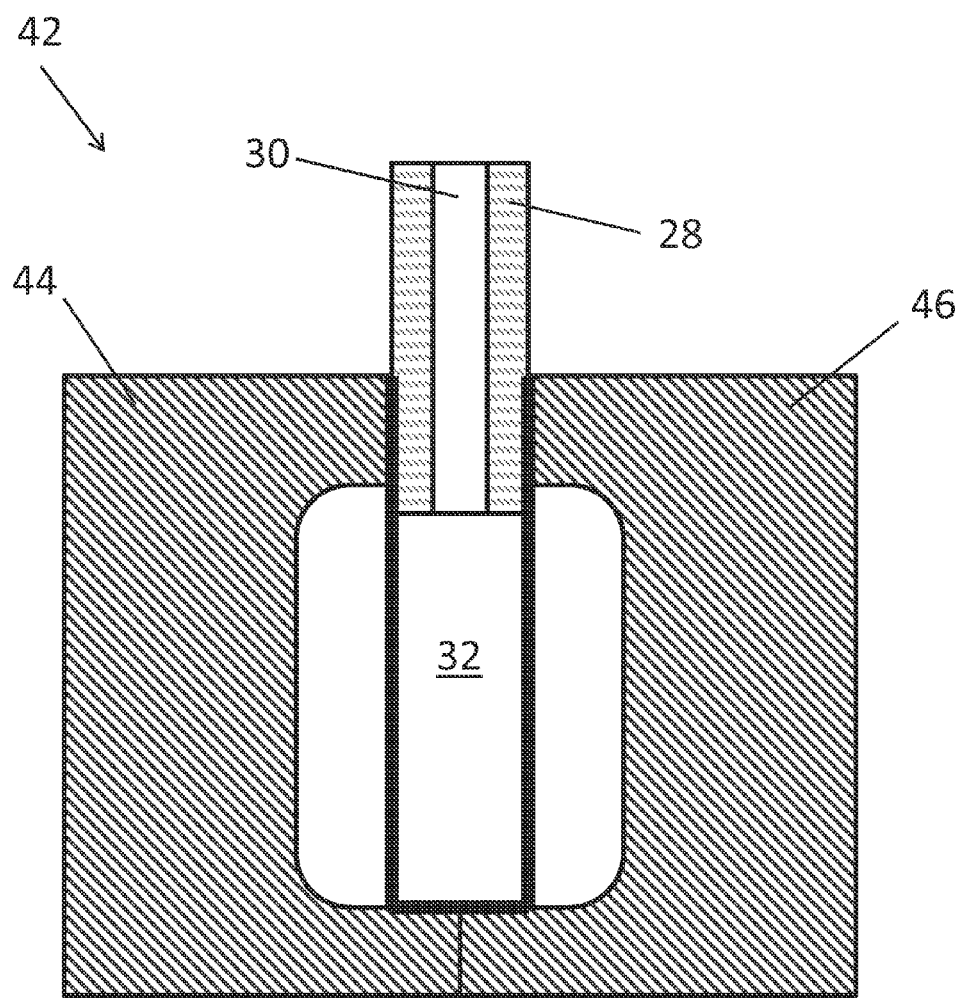
FIG. 7 is a schematic illustration of another step of an exemplary extrusion blow molding process.
Figure 8:
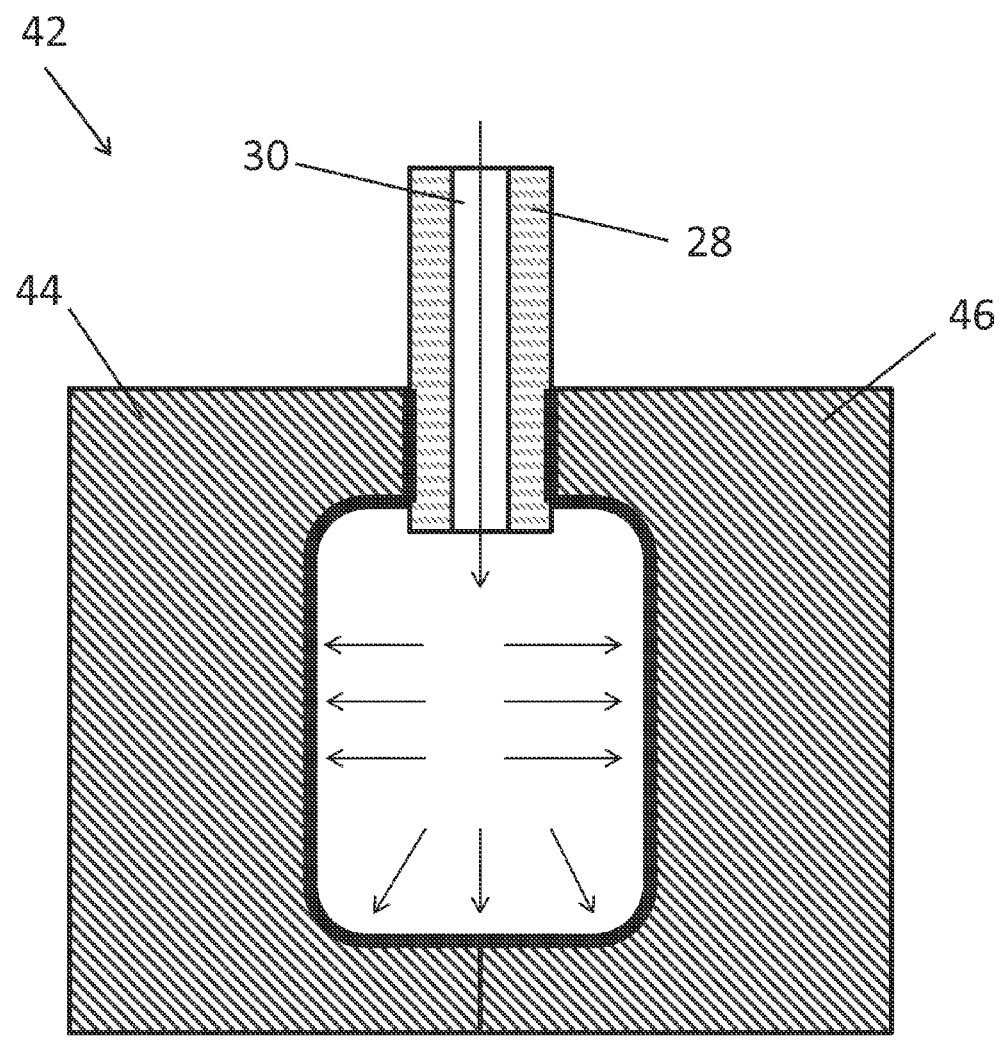
FIG. 8 is a schematic illustration of another step of an exemplary extrusion blow molding process.
Figure 9:
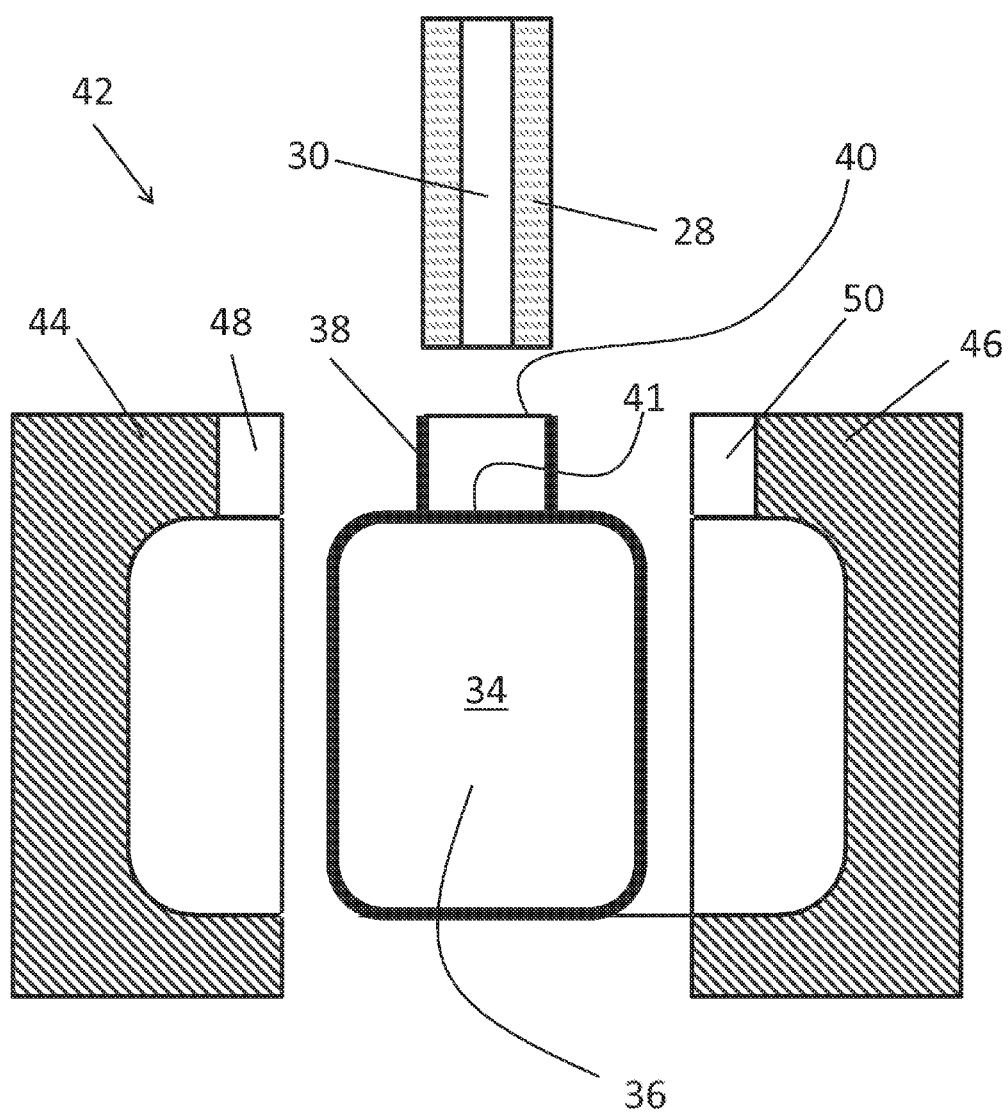
FIG. 9 is a schematic illustration of another step of an exemplary extrusion blow molding process.

It will be understood that FIGS. 1-5 illustrate one example of an extrusion blow molding processes that is used to describe the general apparatus and functions of extrusion blow molding. Those skilled in the art will appreciate that any number of variations or modifications can be made to the extrusion blow molding process shown in FIGS. 1-5 and still be encompassed by this disclosure. For example, in FIGS. 1-5 the blow pin 28 is positioned below the mold 13 and moves upwardly to engage the parison 32 within the mold 13. However, as illustrated in FIGS. 6-9, the blow pin 28 can also be positioned above a mold 42. In such an arrangement, as illustrated in FIG. 6, a first mold body 44 and a second mold body 46 are modified so that a first neck forming region 48 and a second neck forming region 50 are positioned at the top of the mold 42 instead of the bottom of the mold 42. As illustrated in FIG. 7, when the mold 42 is closed, the mold 42 pinches off the bottom of the parison 32 and the blow pin 28 is inserted into an opening in the top of the mold 42. As illustrated in FIGS. 8 and 9, the parison 32 is pressurized and the parison expands to fill the mold 42, the mold 42 is opened, and a formed bottle 34 is released. The bottle 34 as illustrated in FIGS. 6-9 can be the same bottle 34 manufactured by the process illustrated in FIGS. 1-5.

Figure 10:
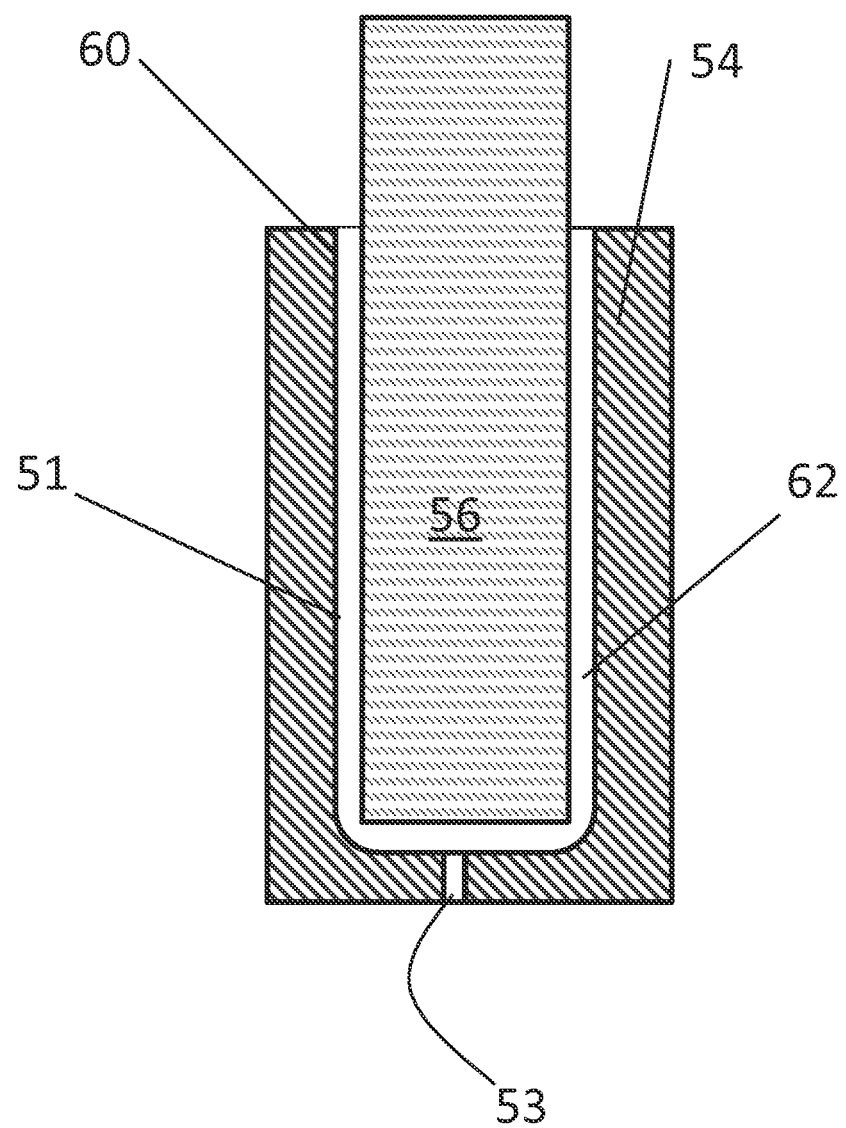
FIG. 10 is a schematic illustration of a step of an exemplary injection blow molding process.

FIGS. 10-14 illustrate an exemplary injection blow molding process for forming a vessel such as a bottle for containing liquids. Injection blow molding is generally a two-step process. The first step is to injection mold a preform 52. As illustrated in FIG. 10, a core pin 56 is positioned within a preform mold 54, where the positioning of the core pin 56 leaves a volume of space 51 between the core pin 56 and the walls of the preform mold 54. As will be understood, the space 51 between the core pin 56 and the walls of the preform mold 54 can be arranged to generally be the desired shape of the molded preform 52. The preform mold 56 can be a one-part mold, or a two-part mold, or any other configuration of mold that can form a preform through injection molding. The preform mold 54 can include an injection passage 53 that provides a pathway for molten polymeric material to be injected into the space 51 between the core pin 56 and the walls of the preform mold 54.

Figure 11:
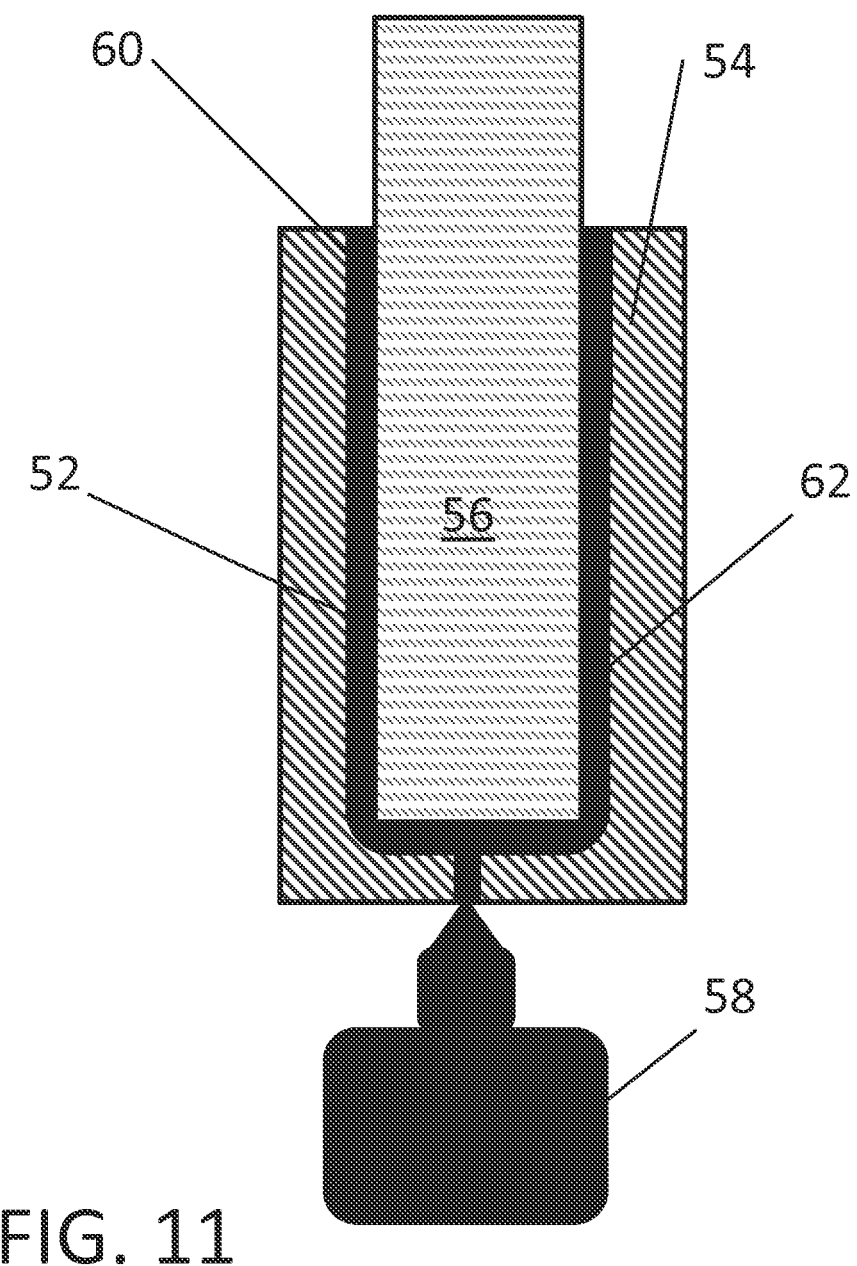
FIG. 11 is a schematic illustration of another step of an exemplary injection blow molding process.
Figure 12:
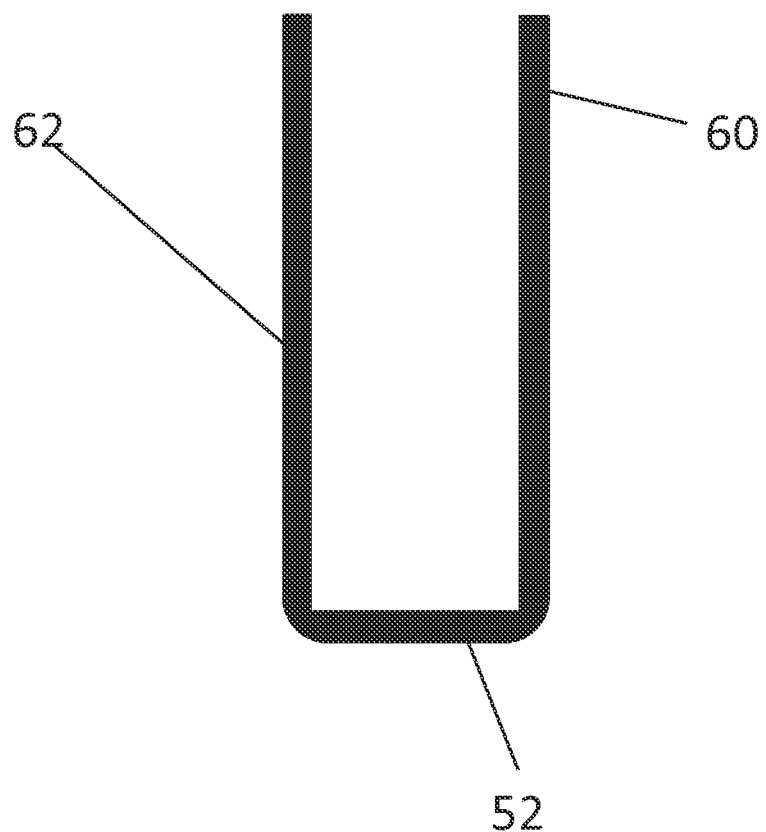
FIG. 12 is a schematic illustration of another step of an exemplary injection blow molding process.

As illustrated in FIG. 11, an injection molding apparatus 58 can inject molten plastic through the injection passage 53 and into a space 51 between the preform mold 54 and the core pin 56 to form the preform 52. Once the space 51 between the preform mold 54 and the core pin 56 is filled, the plastic can be cooled. The preform mold 54 is opened and, as illustrated in FIG. 12, a solidified preform 52 results.

The preform 52 typically includes a neck portion 60 and a parison portion 62. The neck portion 60 can be formed between the rigid surfaces of the preform mold 54 and core pin 56 and, thus, can be formed with precise dimensions and features. Features on the neck portion 60 can include threads on the outside surface of the neck portion 60 that can accommodate a screw cap and/or a lip formed on the outside surface of the neck portion 60. In addition, as will be subsequently described herein, the core pin 56 can be arranged so that a raised or stepped feature is formed on the inside of the neck portion 60. The inside of the neck portion 60 that includes the raised or stepped feature can serve as a high quality sealing surface that is formed without substantial defects. Similarly, the wall thickness of the parison portion 62 can be formed between the rigid surfaces of the preform mold 54 and core pin 56 and, typically, can have precise and uniform thickness.

Figure 13:
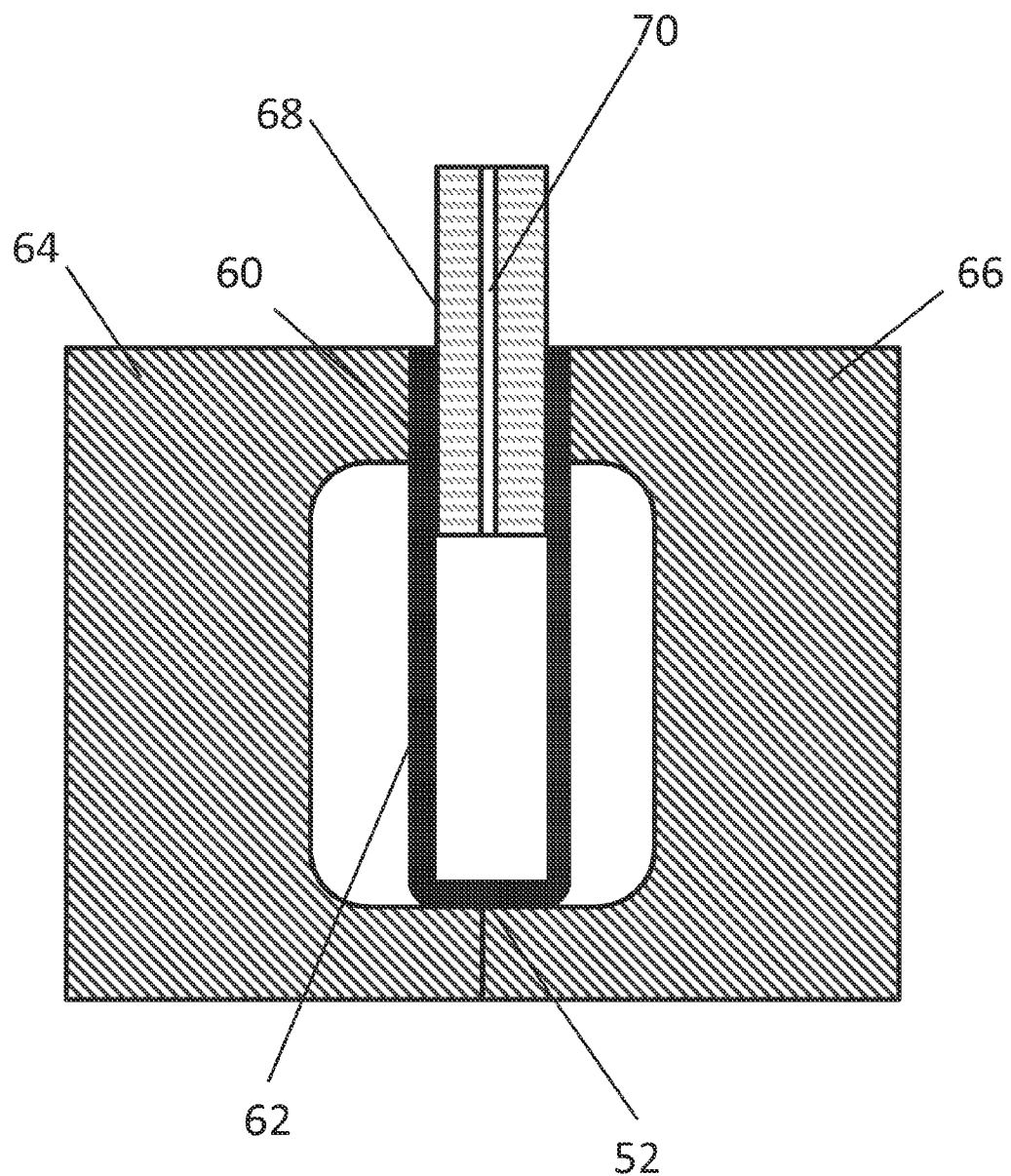
FIG. 13 is a schematic illustration of another step of an exemplary injection blow molding process.
Figure 14:
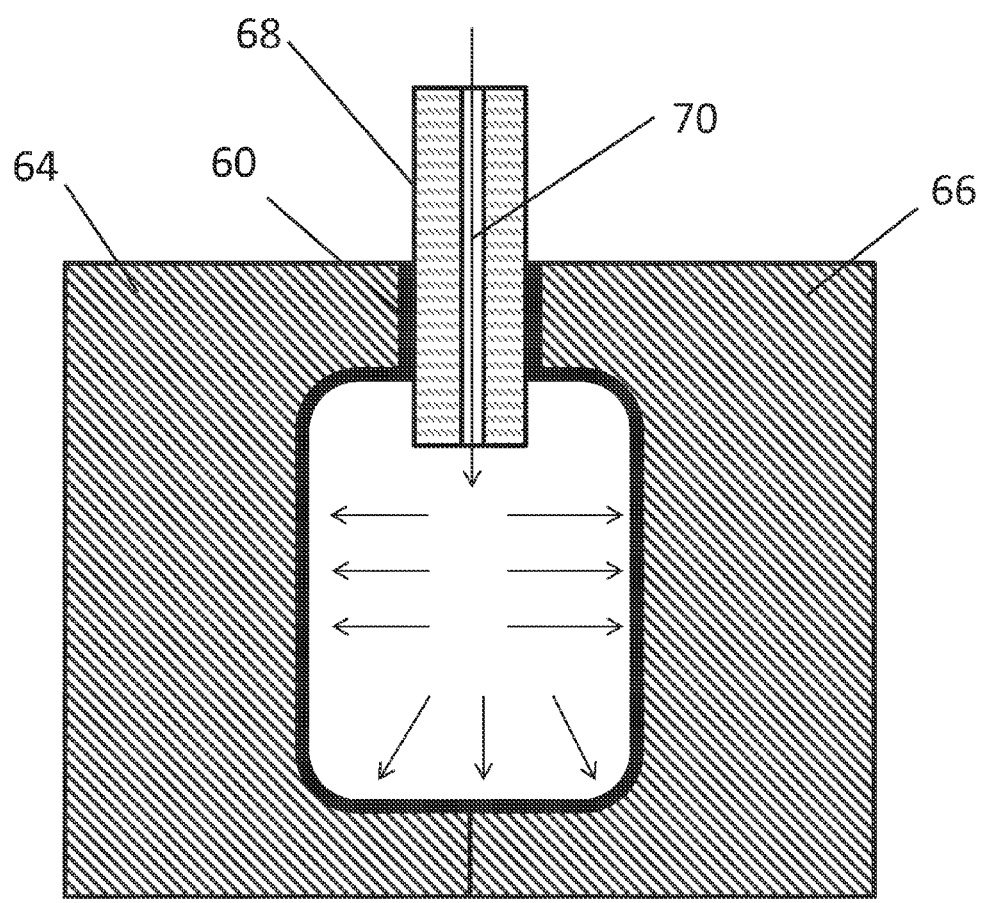
FIG. 14 is a schematic illustration of another step of an exemplary injection blow molding process.
Figure 15:
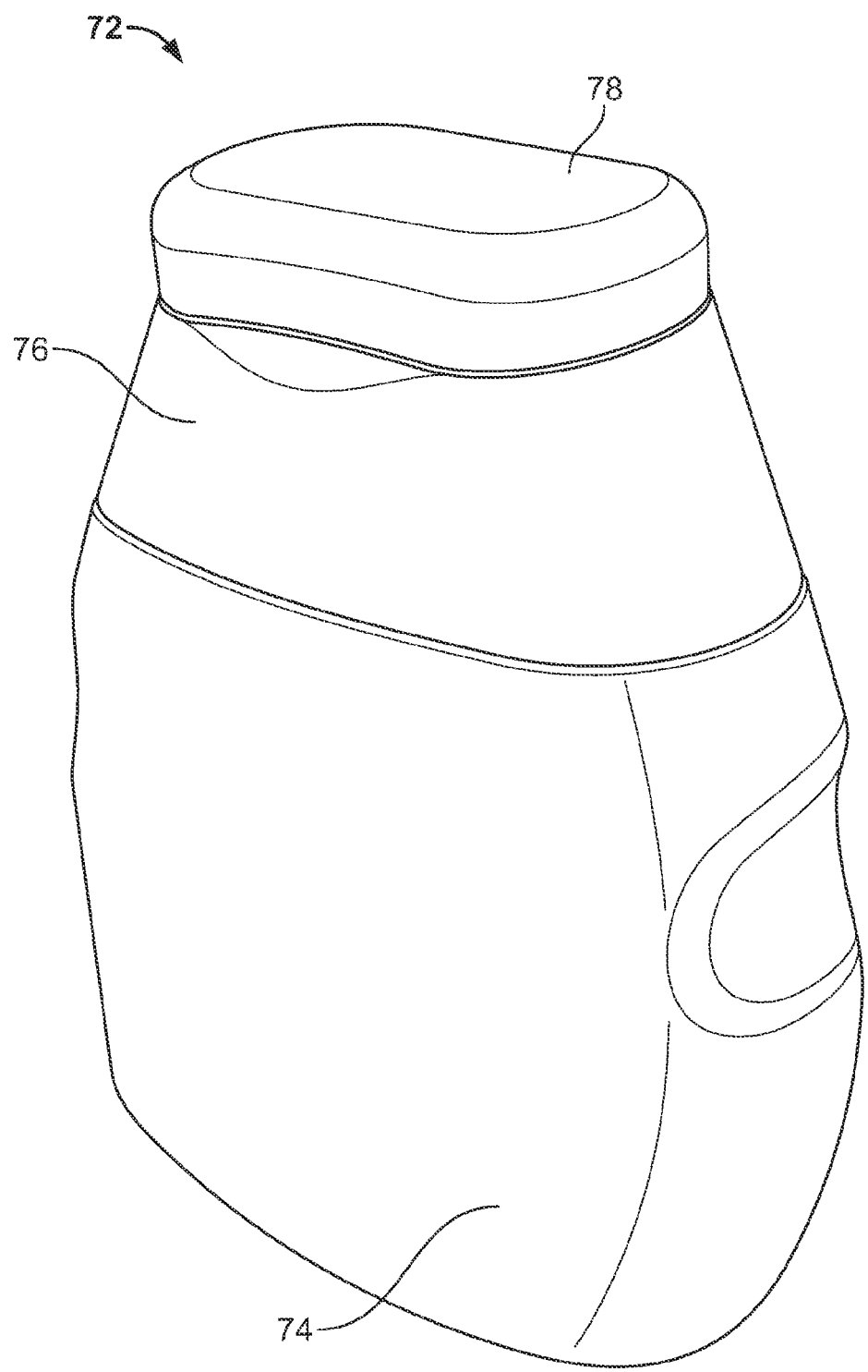
FIG. 15 is a photograph showing a perspective view of a bottle assembly.
Figure 16:
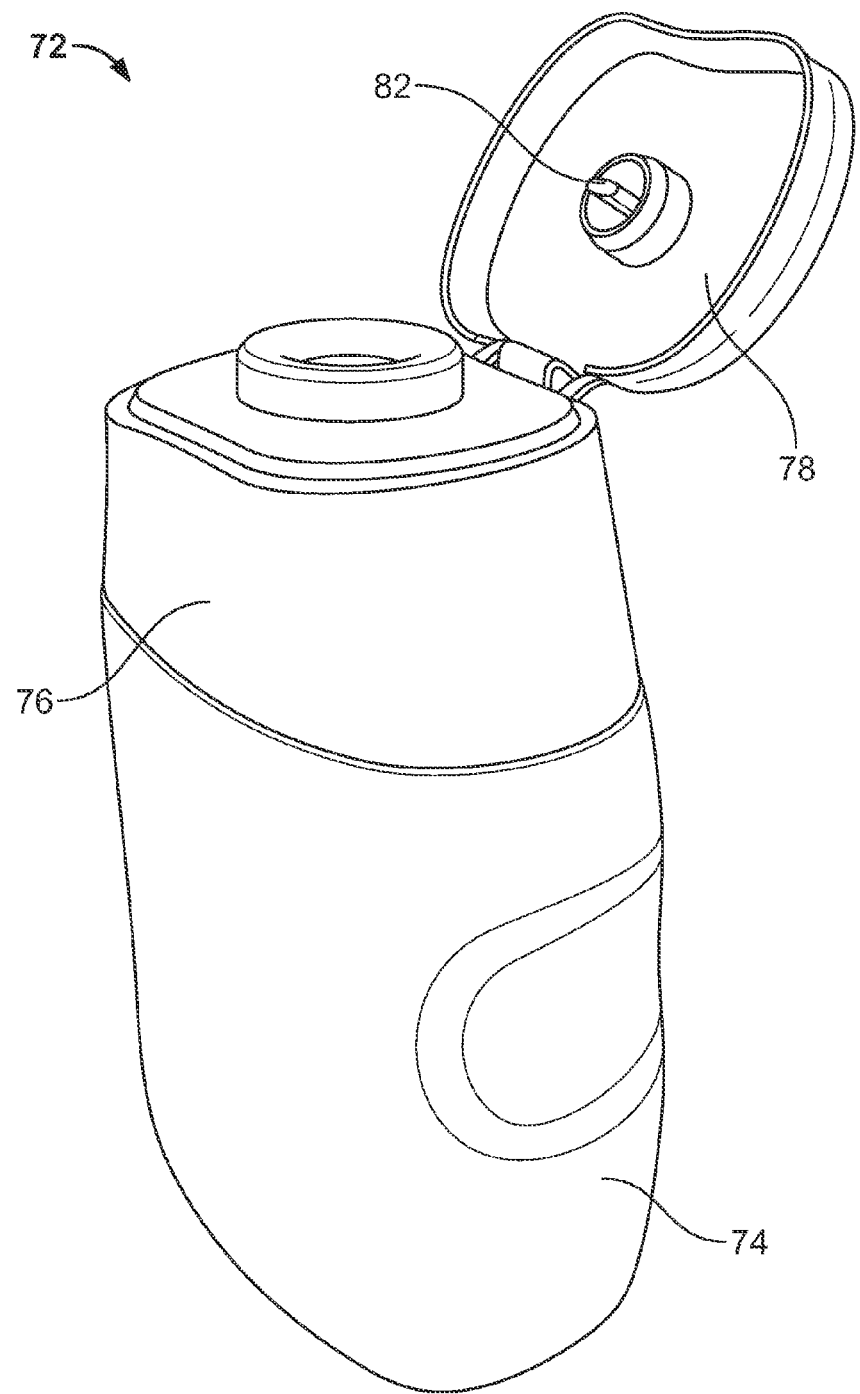
FIG. 16 is a photograph showing a perspective view of a bottle assembly with the lid open.
Figure 17:
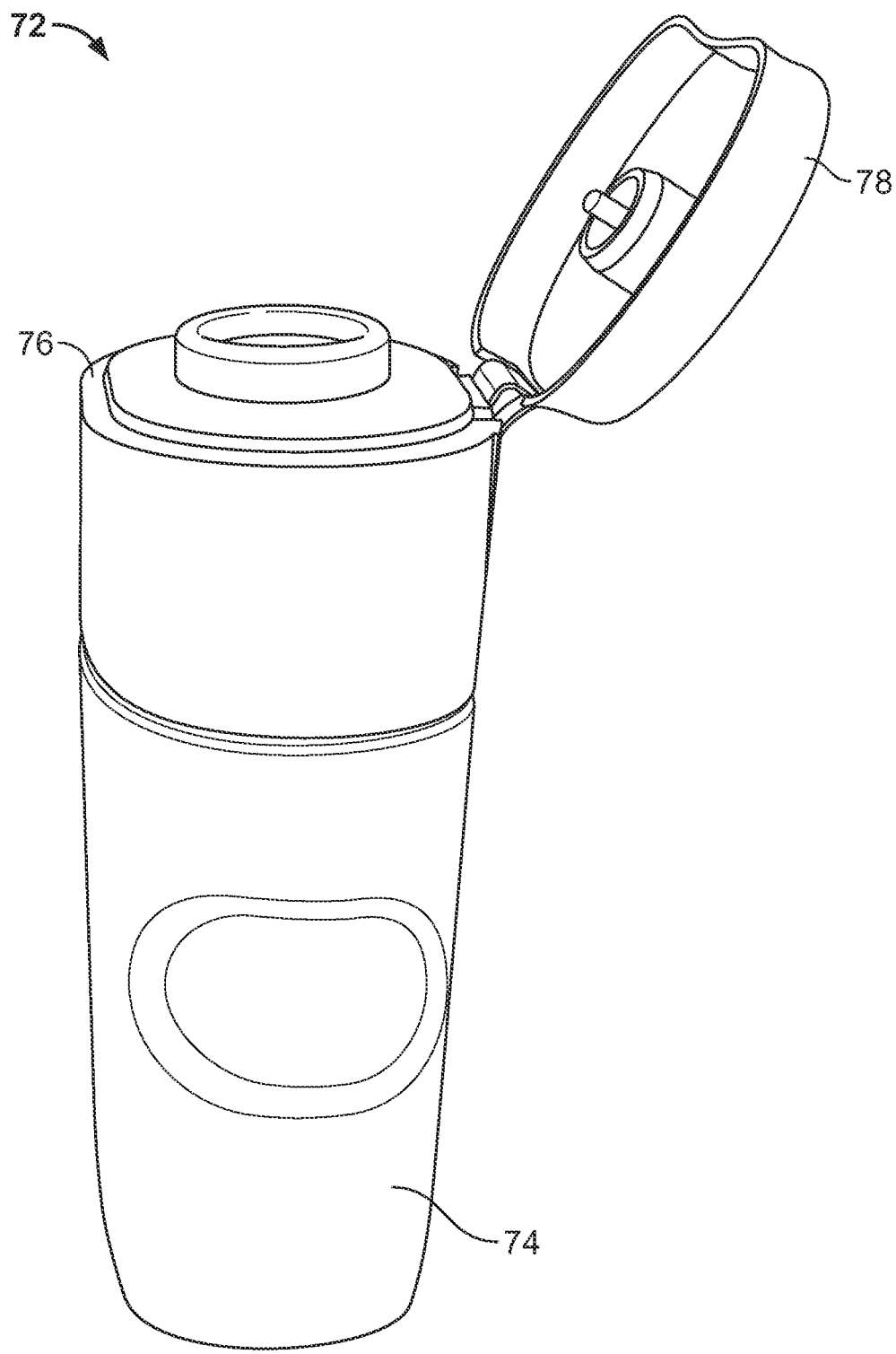
FIG. 17 is a photograph showing a side view of a bottle assembly with the lid open.

As illustrated in FIG. 13, the preform 52 can be placed between a first mold body 64 and a second mold body 66, and a blow pin 68 with an air passage 70 can be positioned within the neck portion 60 of the preform 52. The neck portion 60 of the preform 52 is clamped between the blow pin 68 and the first mold body 64 and the second mold body 66. The first mold body 64, second mold body 66, blow pin 68, and neck portion 60 of the preform 52 can be arranged so that the neck portion 60 is protected for any deformation or alteration in shape from pressure or increased temperatures from the mold. Once the preform 52 is positioned in the mold, the parison portion 62 is heated. As shown in FIG. 14, air is forced into the parison portion 62, and the parison portion 62 expands to fill the cavity of the mold to form a bottle. As discussed above, the blow molding process can be arranged so that the neck portion 60 remains unaffected by the blow molding process.

FIGS. 15-18 show an exemplary bottle assembly 72 that includes a bottle 74 and a cap 76. The bottle 74 can be manufactured by blow molding processes as described herein. The bottle 74 and cap 76 can be arranged so that the cap 76 can be secured to the bottle 74 to form the bottle assembly 72. When the cap 76 is secured to the bottle 74, a seal is created between the cap 76 and bottle 74 that is arranged to prevent or minimize leakage of liquid stored in the bottle assembly 72.

Figure 18:
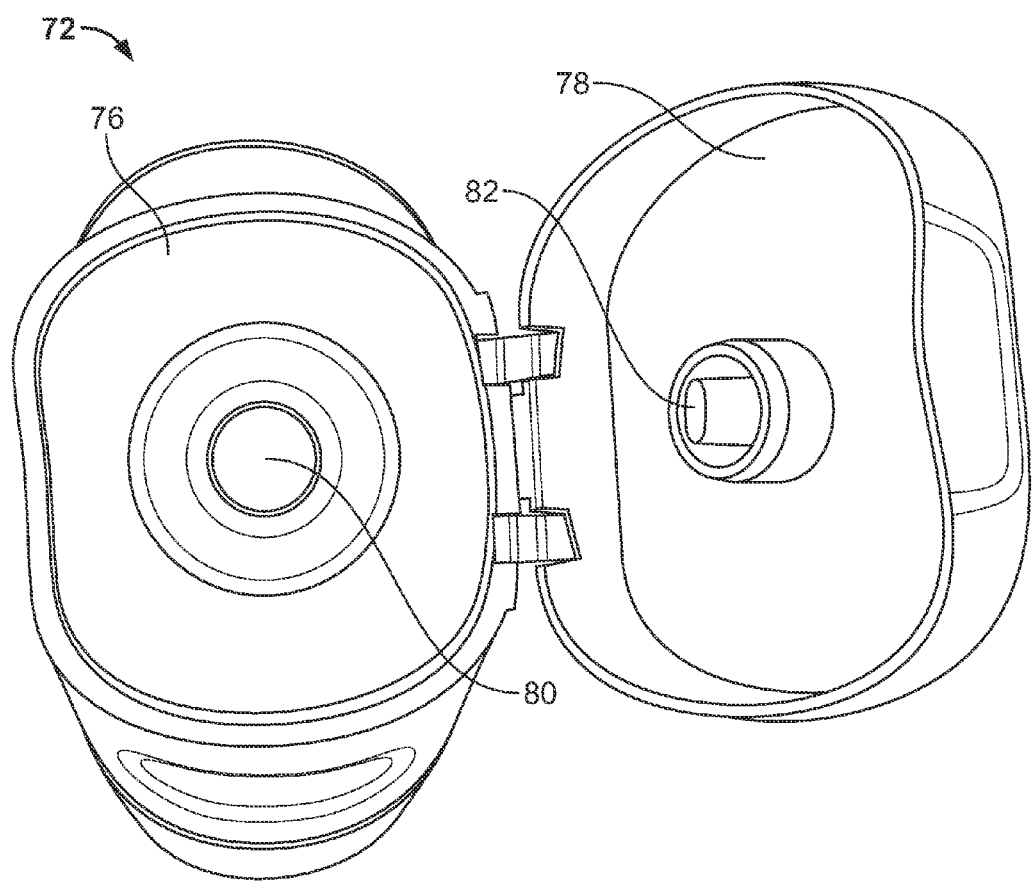
FIG. 18 is a photograph showing a top view of a bottle assembly with the lid open.

The cap 76 includes a lid 78 that can be selectively opened so that a user of the bottle assembly 72 can access and dispense the liquid in the bottle assembly 72. As shown in FIG. 18, the cap 76 includes a valve 80 through which liquid can be dispensed. The valve 80 can be manufactured from a flexible polymer such as an elastomer. The valve 80 can be arranged so that liquid readily dispenses when the lid 78 is opened and pressure is applied to the body of the bottle 74. A tab 82 attached to the underside of the lid 78 engages with the valve 80 to plug the valve 80 when the lid 78 is closed, thus, preventing liquid from being dispensed through the valve 80.

Figure 19:
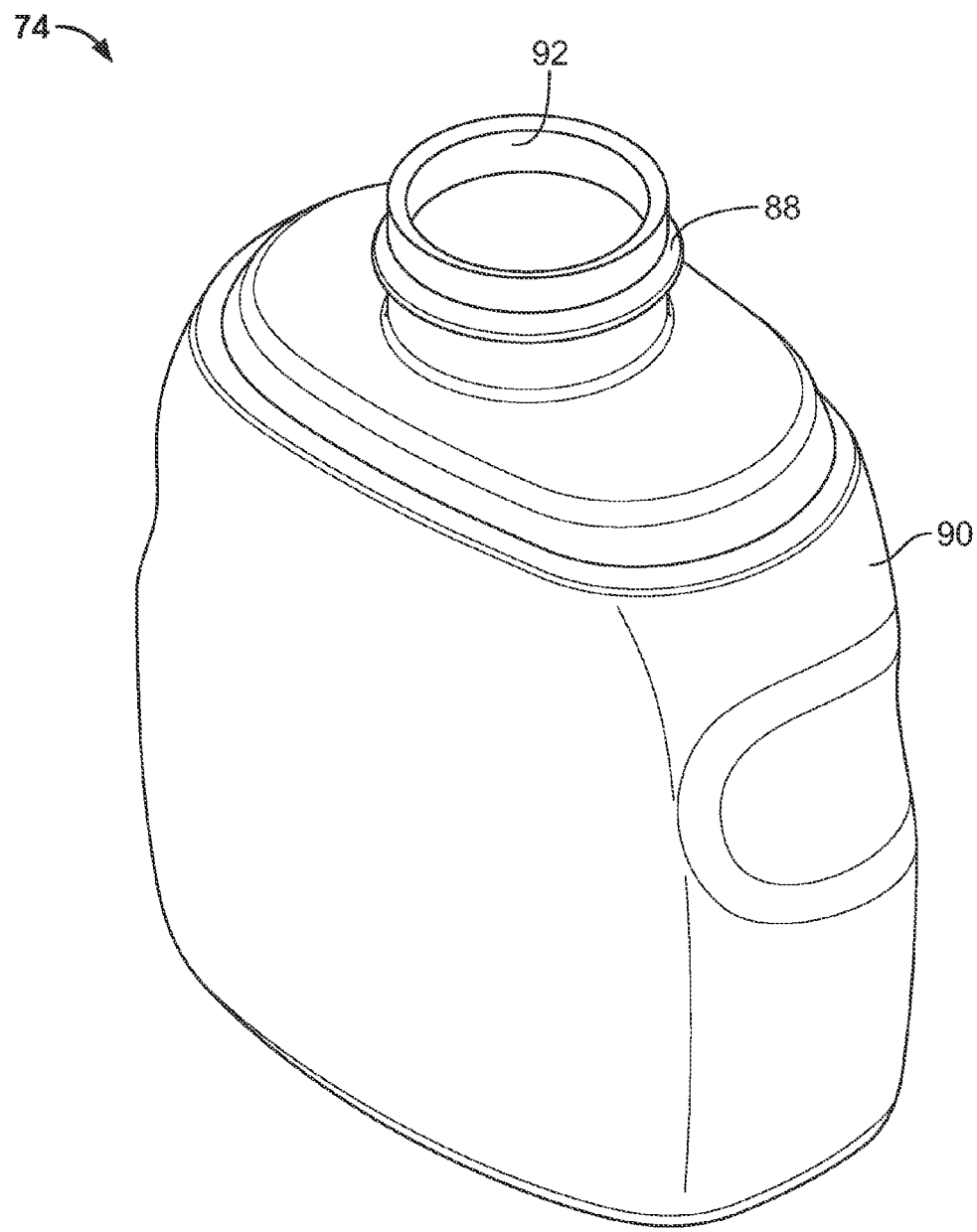
FIG. 19 is a perspective view of a bottle of a bottle assembly.
Figure 20:
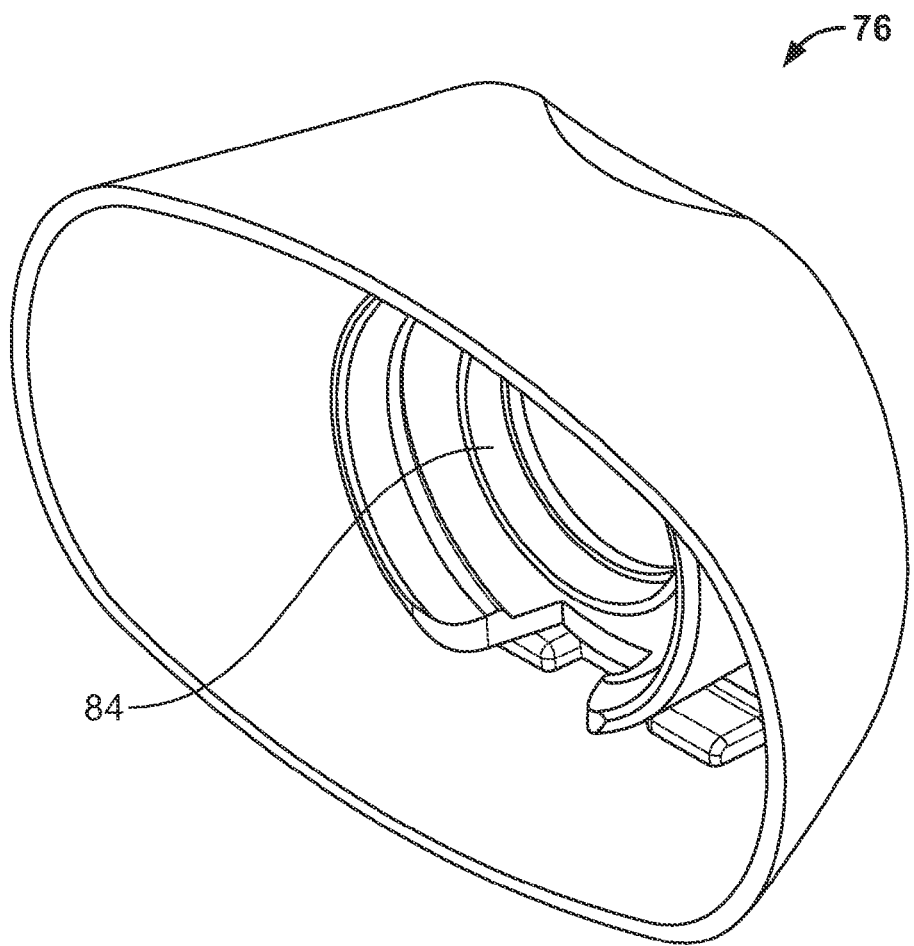
FIG. 20 is a perspective view of a cap of a bottle assembly.
Figure 21:
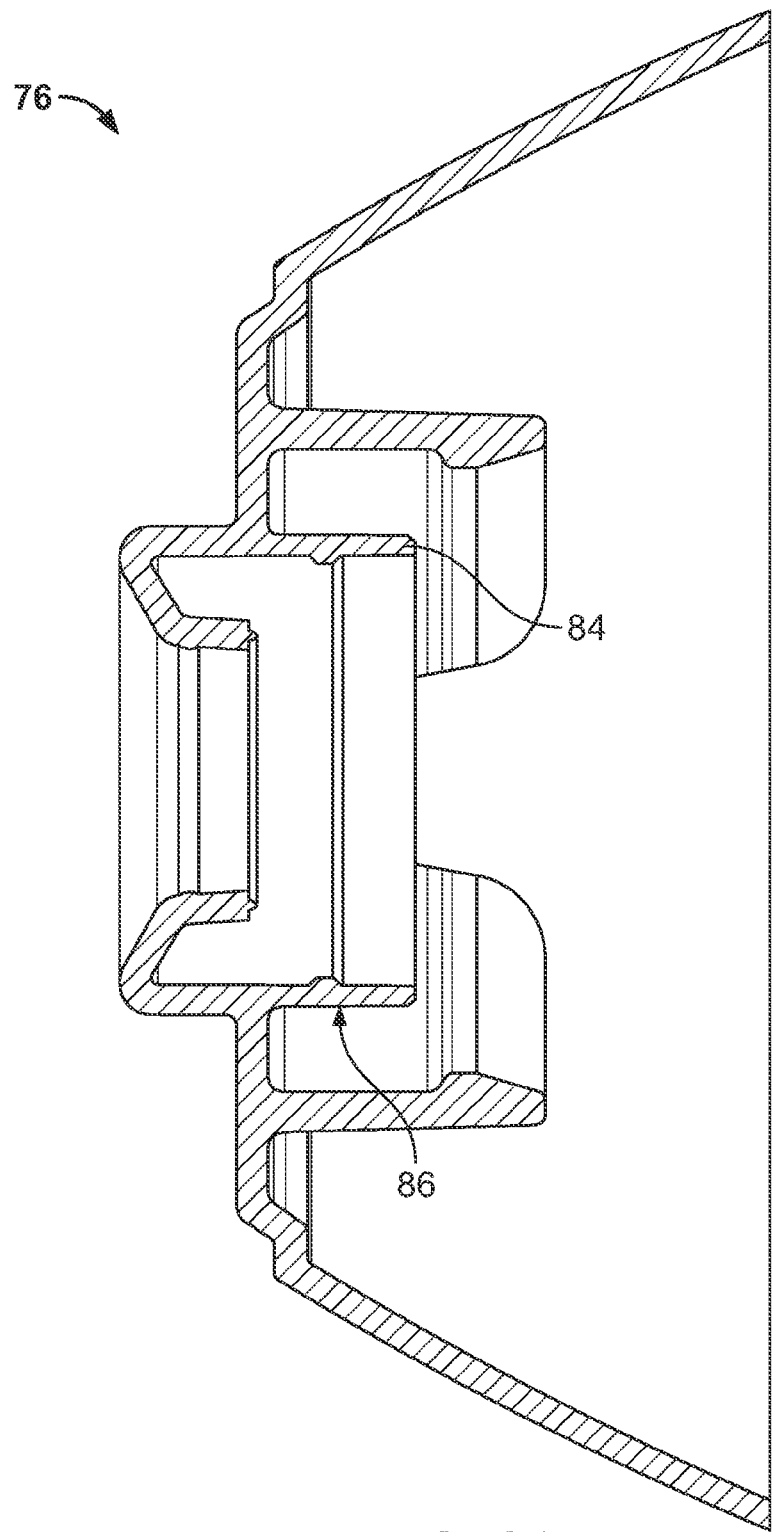
FIG. 21 is a cross-sectional view of a cap of a bottle assembly.
Figure 22:
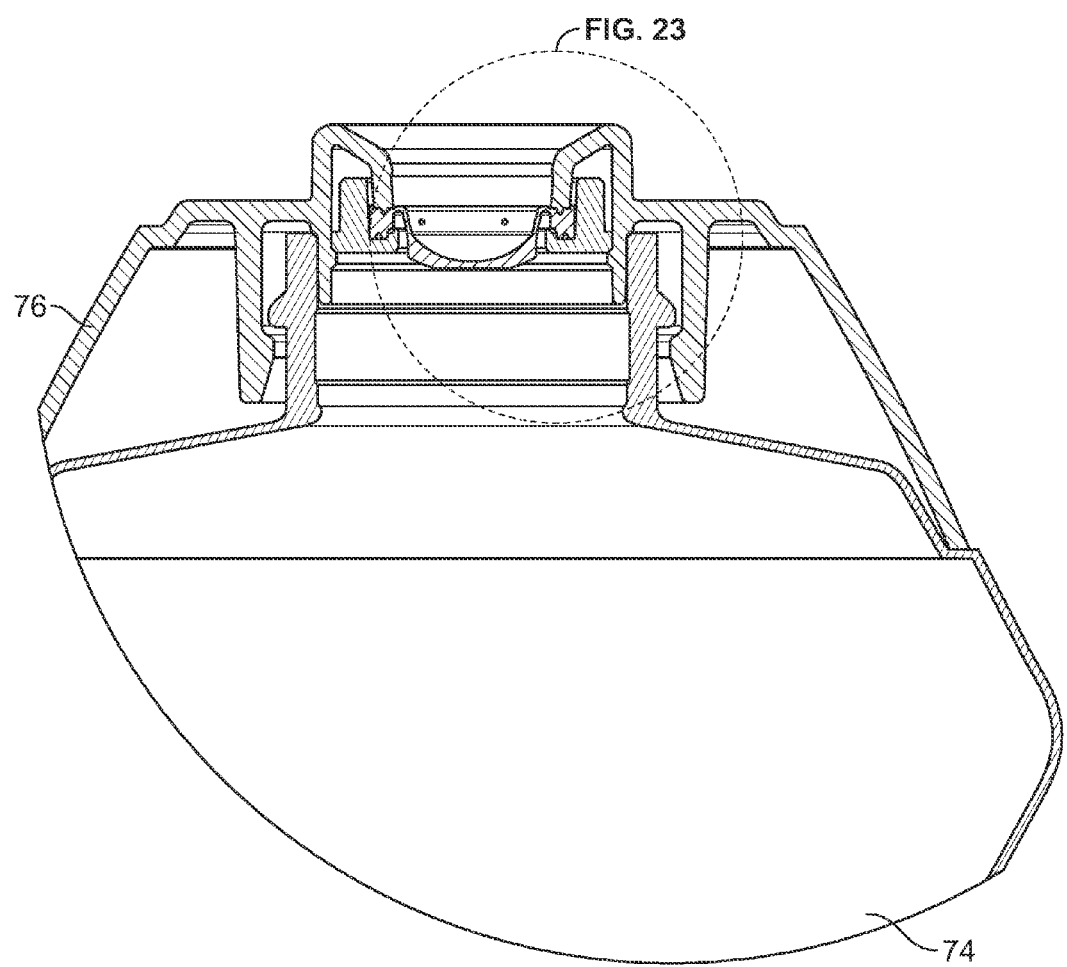
FIG. 22 is a cross-sectional view of a cap secured to a bottle of a cap assembly.
Figure 23:
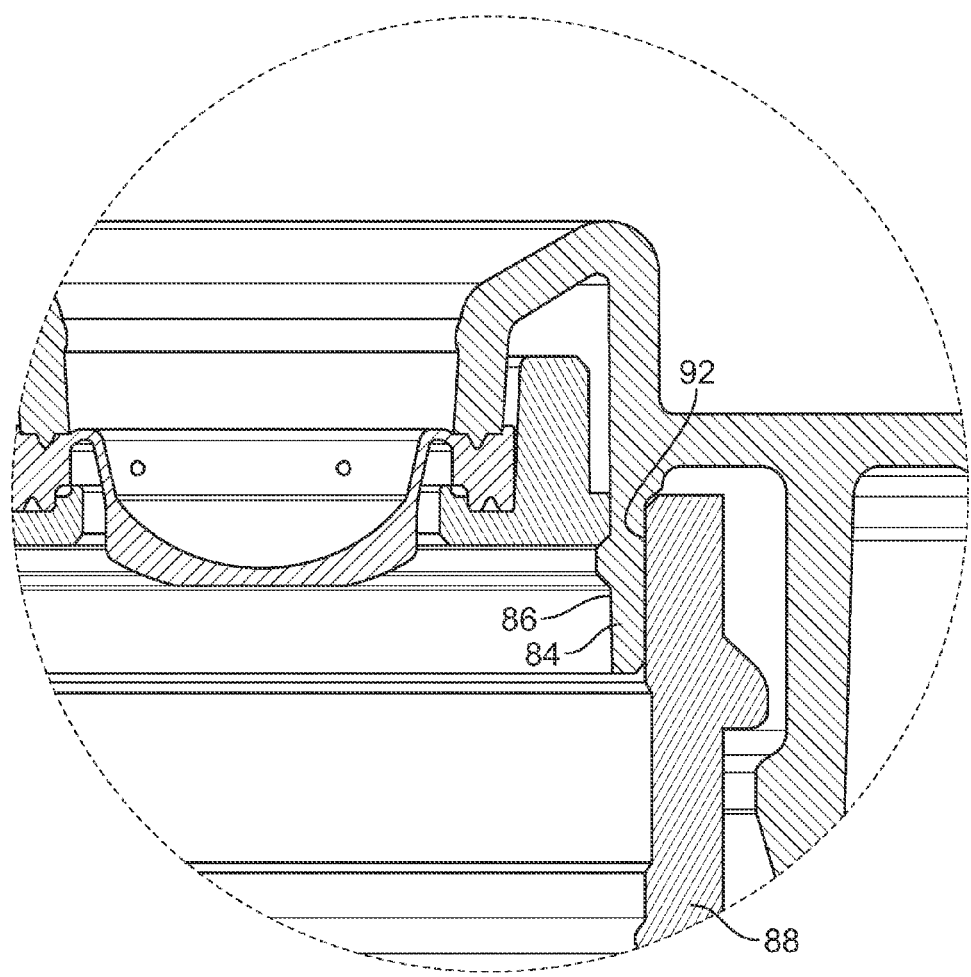
FIG. 23 is a detailed view of the cap secured to a bottle shown in FIG. 22.

FIG. 19 illustrates the bottle 74. FIGS. 20 and 21 illustrate the cap 76. The bottle 74 and cap 76 are arranged so that when the cap 76 is secured to the bottle 74, a seal is created between the bottle 74 and the cap 76 to stop any leakage of liquid from the bottle assembly 72 when the lid 78 is closed. The cap 76 includes an annular ring 84 extending from the underside of the cap 76. As best shown in FIG. 21, the outside surface of the annular ring 84 defines a cap sealing surface 86. As previously described, the bottle 74 includes a neck 88 extending from a body 90 of the bottle 74. A least a portion of the inside surface of the neck 88 defines a bottle sealing surface 92. In one embodiment, the bottle seal surface 92 includes a raised area and is generally free from flaws and defects. The raised area can be an annular raised area positioned along the circumference of the inside surface of the neck 88 of the bottle 74. As illustrated in FIGS. 22 and 23, when the cap 76 is assembled with the bottle 74, the annular ring 84 of the cap 76 is inserted into the neck 88 of the bottle 74 (see FIG. 23) so that the cap sealing surface 86 engages with the bottle sealing surface 92 to create a seal through which the liquid in the bottle assembly 72 cannot leak or otherwise pass through.

In order to create a seal between the cap sealing surface 86 and the bottle sealing surface 92, it can be advantageous to control the properties of the sealing surfaces 86, 92. With regard to the bottle sealing surface 92, as illustrated in FIGS. 1-9, a blow pin can be placed in contact with the bottle sealing surface 92 during the extrusion blow molding of the bottle. With further regard to the bottle sealing surface 92, as illustrated in FIGS. 10-14, a core pin can be placed in contact with the bottle sealing surface 92 during the injection molding of the neck portion of the preform that becomes the neck of the bottle. One method of controlling the properties of the bottle sealing surface 92 is through novel arrangements and configurations for a blow pin used during the extrusion blow molding process and a core pin used during the injection molding process. Generally, this disclosure discusses arrangements and features of blow pins used in extrusion blow molding. However, it will be appreciated that the features of blow pins and the methods of using such blow pins during extrusion blow molding are also applicable to core pins used for injection blow molding processes.

Conventionally, straight blow pins (i.e., shaped as a straight cylinder with no variations in diameter) or tapered blow pins (i.e., shaped as a truncated cone where the diameter of the blow pin decreases toward the distal end of the blow pin) are used in extrusion blow molding to form the neck portion of a vessel such as a bottle. However, such conventional straight and tapered blow pins typically result in the inner surface of the neck of the bottle being marred by defects, imperfections and other such flaws. When a bottle with such flaws in the inner surface of its neck is assembled with a cap to form a bottle assembly, flaws are located at the interface of the bottle sealing surface 92 and the cap sealing surface 86. Because bottles can be used to store liquids, any pressure applied to the bottle assembly during shipping or storage or due to temperature and other climate changes, can cause liquid to seep through the flaws and leak out of the bottle assembly. Thus, making the bottle assembly unusable or ineffective for its intended purpose. When mass producing such bottles, it is important that any defects that may cause leaks be eliminated or approach such a small number per millions of vessels that the incidence of failure is rare.

Flaws in the inner surface of the neck of the bottle can be generated in a number of ways. For example, the extrusion blow molding process applies an internal pressure to the parison to cause the parison to expand. Typically, while the bottle is being blow molded, one escape route for pressurized air is along the interface between the outer surface of the blow pin and the inner surface of the portion of the parison that is to be formed into the inner surface of the neck. Because the parison is formed from molten plastic, the plastic can flow and create gaps that can form pathways for pressurized air to escape between the blow pin and the parison. When pressurized air escapes through such gaps and pathways, air flow lines can be formed in the inner surface of the neck when the plastic cools and hardens into a bottle. Once a bottle with such flow lines in the inner surface of its neck is assembled with the cap to form a bottle assembly, when the bottle assembly is filled with liquid and subject to pressure, the liquid can leak from the bottle assembly along the air flow lines. Thus, making the bottle assembly unusable or at least ineffective.

In another example, as a blow pin is inserted into a closed mold (as illustrated in FIGS. 2 and 3), the blow pin typically engages with the parison during insertion. Because the parison is molten plastic, the plastic can flow, fold, and otherwise move when contacted by the blow pin. Such movement of the molten plastic is unpredictable and not repeatable, and can create inconsistencies in the inner surface of the bottle neck. Such inconsistencies can create flow paths for liquids stored in a bottle assembly to leak from the bottle assembly. For example, if an excess of material gathers in one location between the blow pin and mold cavity, a bulge or clump of plastic material can form on the inside surface of the bottle neck. When the cap is secured to the bottle, the bulge or clump of plastic material on the inside surface of the bottle neck can cause an inconsistent seal between the bottle and the cap, which can result in a pathway for liquid to leak from the bottle assembly.

In another example, when the blow pin encounters the parison it may push plastic to just below the neck area and during the extrusion blow molding process air pressure may create a thicker area of plastic just below or in the seal area. When such an area is encountered by the annular ring of the cap, the thicker area of plastic may push the annular ring of the cap inward and create an pathway for liquid or vapor to engage the seal area.

In another example, it is beneficial for the cap sealing surface of the annular ring to be very smooth and free of defect when engaging a bottle sealing area. A small combination of defects in the cap sealing surface and/or the bottle sealing surface can contribute to a leak. Examples of techniques and methods for minimizing or eliminating defects on the seal surface of the cap include, for example, controlling the tooling that forms the cap. In one example, the cap can be injection molded. Such a process can generally provide for relatively tight controls on dimensions and tolerances of the molded component, including in the case of a cap, its sealing surface. Therefore, by injection molding a cap, defects on the sealing surface of the cap can be minimized or eliminated. In another example, the mold surfaces used to form the sealing surface of the cap can be formed and maintained so that the mold surfaces remain smooth and defect free throughout the use of the mold in forming caps. As an initial matter, the surfaces of the mold used to form the sealing surface of the cap can be polished to a smooth finish. For example, the surface finish of a mold surfaces can be polished to a standard of SPI A-3 or higher. In another example, the mold surfaces can be polished to a standard of SPI A-2 or higher. It will be understood that the surface finish of a mold will wear over time as the mold is used to make components. To account for such wear, the mold can be maintained on a regular schedule, where the mold is polished to return it to the desired SPI standard. In addition to fabricating the mold surfaces with a satisfactory finish and maintaining the finish over time, the molds can be periodically inspected to determine wear and damage due to use. When wear or damage is observed, the surfaces of the mold can be refurbished or new molds can be implemented to maintain the seal surfaces of the cap free of defects.

Similarly, with regard to tooling for forming the bottle by extrusion blow molding (or forming the neck of the bottle through injection blow molding), similar maintenance as described for tooling that forms the cap can be performed. Such maintenance will be subsequently described in detail. When extrusion blow molding processes are used to mass produce components at a high production rate, tooling, such as blow pins and mold surfaces, can become worn and damaged. The surface of the blow pins can also include imperfections and defects cause during the forming of the blow pin or mechanically handling of the blow pin during use. The continued use of worn blow pins or blow pins with outer surface defects can lead to flaws or defects in the inner surfaces of the neck, including the sealing surface of the neck, that are in contact with worn or damaged areas of the blow pin. Similar to the air flow lines discussed above, liquid stored in a bottle assembly can leak through flaws or defects in either the cap sealing surface or bottle sealing surface to make the bottle assembly ineffective or unusable.

When a bottle assembly is intended to store liquids, a high quality sealing surface on the inside of the bottle neck that is free from flaws, coupled with a high quality sealing surface on the cap, can result in a bottle assembly that can hold liquids under pressure without leakage. It will be understood that flaws or defects on either the neck of the bottle or the cap can cause leaks, thus, rendering the bottle assembly ineffective. One method of controlling the inner surface of the bottle neck to form a high quality sealing surface is to use a stepped blow pin or a stepped core pin.

Figure 24:
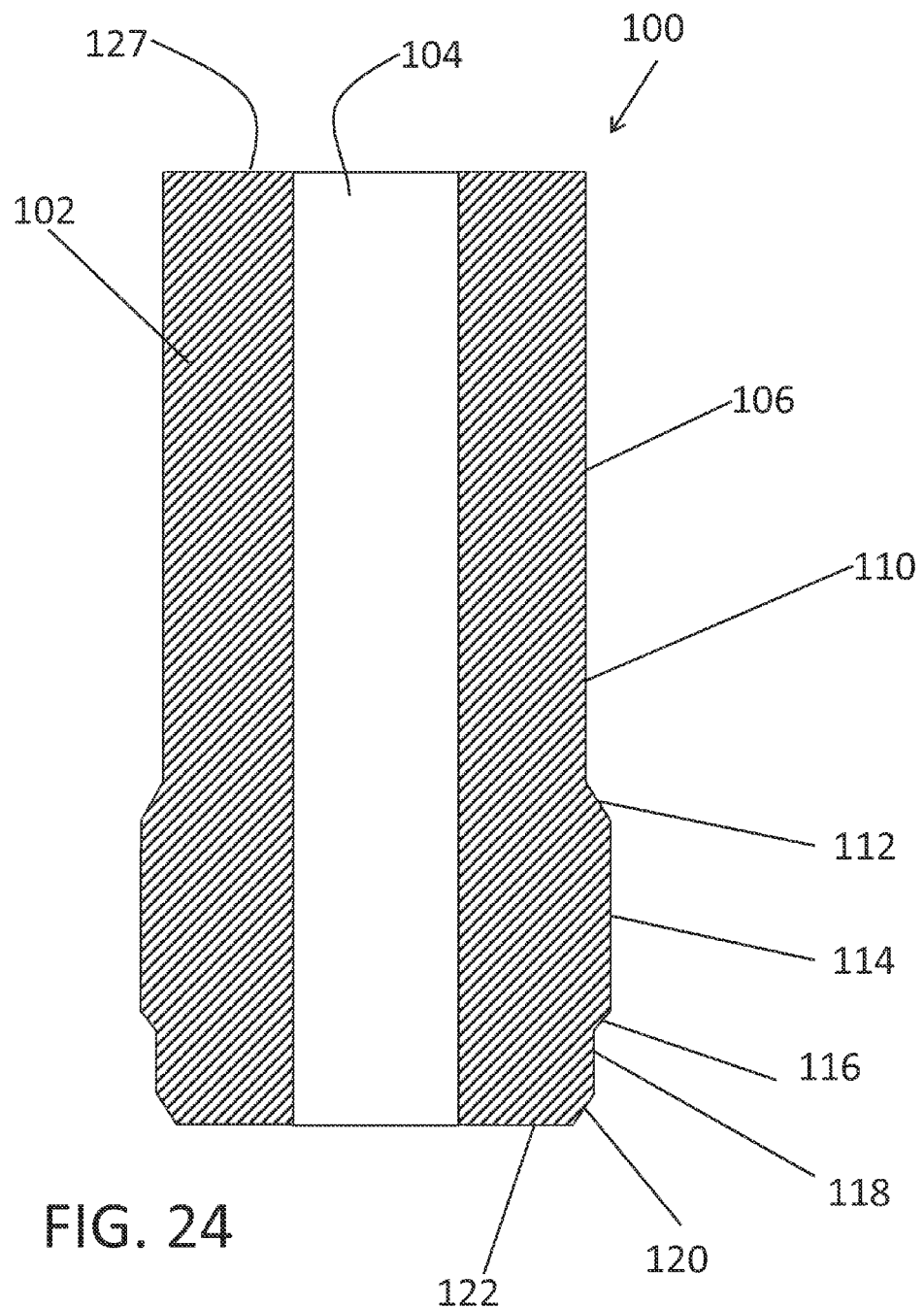
FIG. 24 is a schematic illustration of a cross-section of an exemplary blow pin.

One embodiment of a novel stepped blow pin 100 for use in extrusion blow molding a bottle is illustrated in cross-section in FIG. 24. The blow pin 100 includes a body 102 and an air passage 104 through which air can be injected into a parison. As illustrated in FIG. 24, the blow pin 100 can include a number of regions with differing outer diameters. As shown, the blow pin 100 can include an upper region 106 with a first diameter. A portion of the upper region 106 can be used to form the bottle sealing surface portion of the inner surface of the bottle neck that will engage with a cap sealing surface to seal the bottle assembly. As shown in FIG. 24, such a seal surface region 110 of the blow pin 100 can be located on the lower portion of the upper region 106. Below the seal surface region 110 is a first beveled surface 112 that transitions the blow pin 100 from the upper region 106 to a middle region 114. The middle region 114 has a second diameter that is greater than the first diameter of the upper region 106. Below the middle region 114 is a second beveled surface 116 that transitions the blow pin 100 from the middle region 114 to a lower region 118. The lower region 118 has a third diameter that is less than the second diameter of the middle region 114. In one embodiment, the first diameter and the third diameter can be generally equal. Finally there is a third beveled surface 120 that transitions the blow pin 100 from the lower region 118 to the bottom surface 122 of the blow pin 100. Although certain surfaces are referred to as beveled, it will be understood that such surfaces can be chamfered, sloped, slanted or any other configuration that gradually changes the diameter of the blow pin 100 along the length of the blow pin 100. Any feature of a blow pin that changes the diameter of the blow pin can be referred to herein as a "transition."

Figure 25:
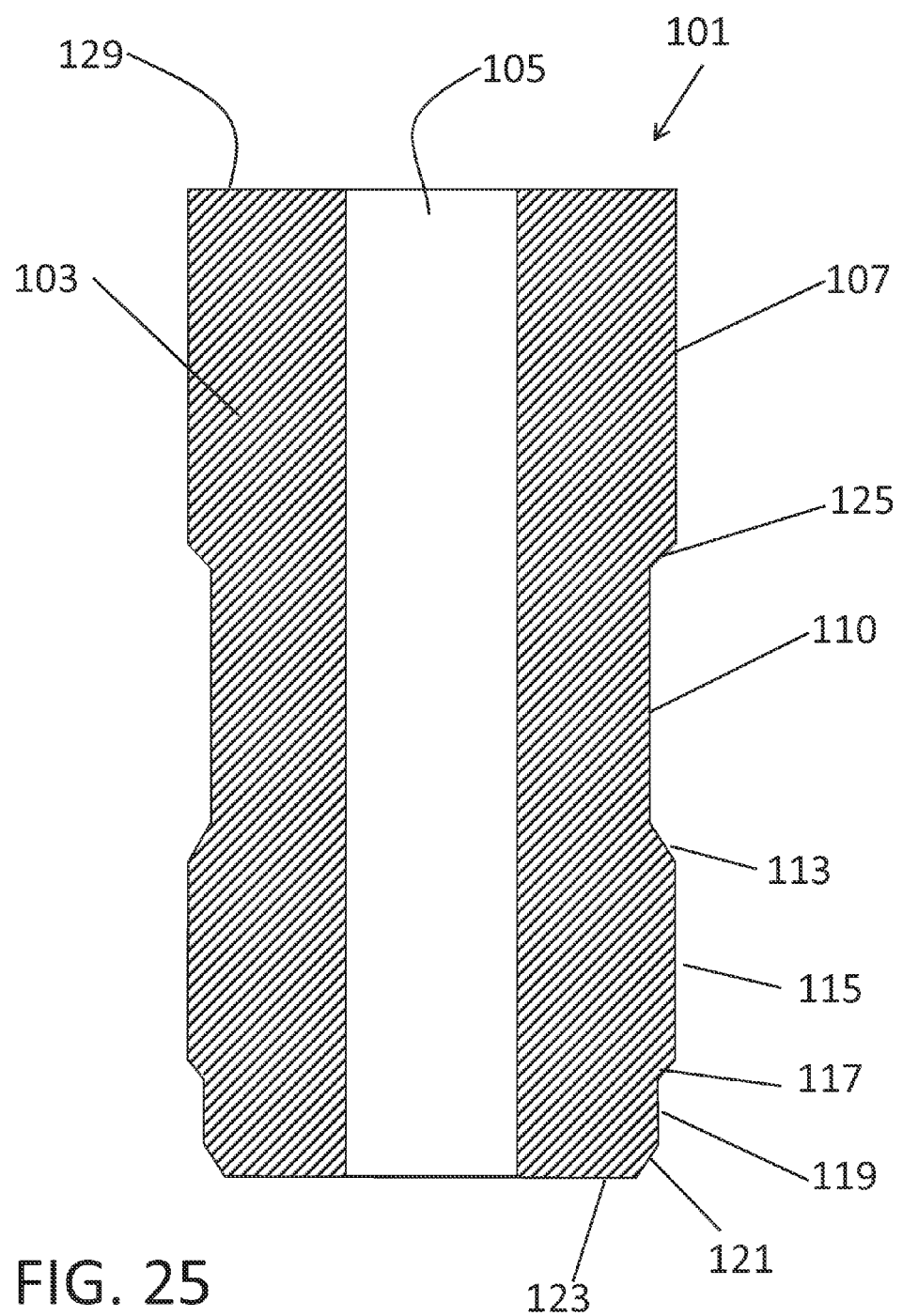
FIG. 25 is a schematic illustration of a cross-section of another exemplary blow pin.

FIG. 25 illustrates, in cross-section, another embodiment of a novel stepped blow pin 100 for use in extrusion blow molding a bottle. Similar to the embodiment illustrated in FIG. 24, the blow pin 101 of FIG. 25 can include a number of regions with differing outer diameters. The blow pin 101 includes a body 103 and an air passage 105 through which air can be injected into a parison, a middle region 115, a lower region 119, and a bottom surface 123. A beveled surface 117 transitions the middle region 115 to the lower region 119, and another beveled surface 121 transitions the lower region 119 to the bottom surface 123. The blow pin 101 of FIG. 25 differs from the blow pin 100 of FIG. 24 in that it includes an upper region 107 above the seal surface region 111 that has a diameter greater than the seal surface region 111. A beveled surface 113 transitions the seal surface region 111 to the middle region 115, and another beveled surface 125 transitions the sealed surface region 111 to the upper region 107. As will be appreciated, the two beveled surfaces 113, 125 at the top and bottom of the seal surface region 111 can defined the seal surface region 111. The pair of beveled surfaces 113, 125 and seal surface region 111 form an annular recess around the circumference of the blow pin 101. It will be understood that when such a blow pin 101 is used to form a bottle, and in particular, the inner surface of the neck of a bottle, the annular recess in the blow pin 101 (which comprises the seal surface region 111 of the blow pin 101) will form a raised area on the inner surface of the neck of the bottle. This raised area will be an annular raised area around the circumference of the inner surface of the neck of the bottle.

Figure 26:
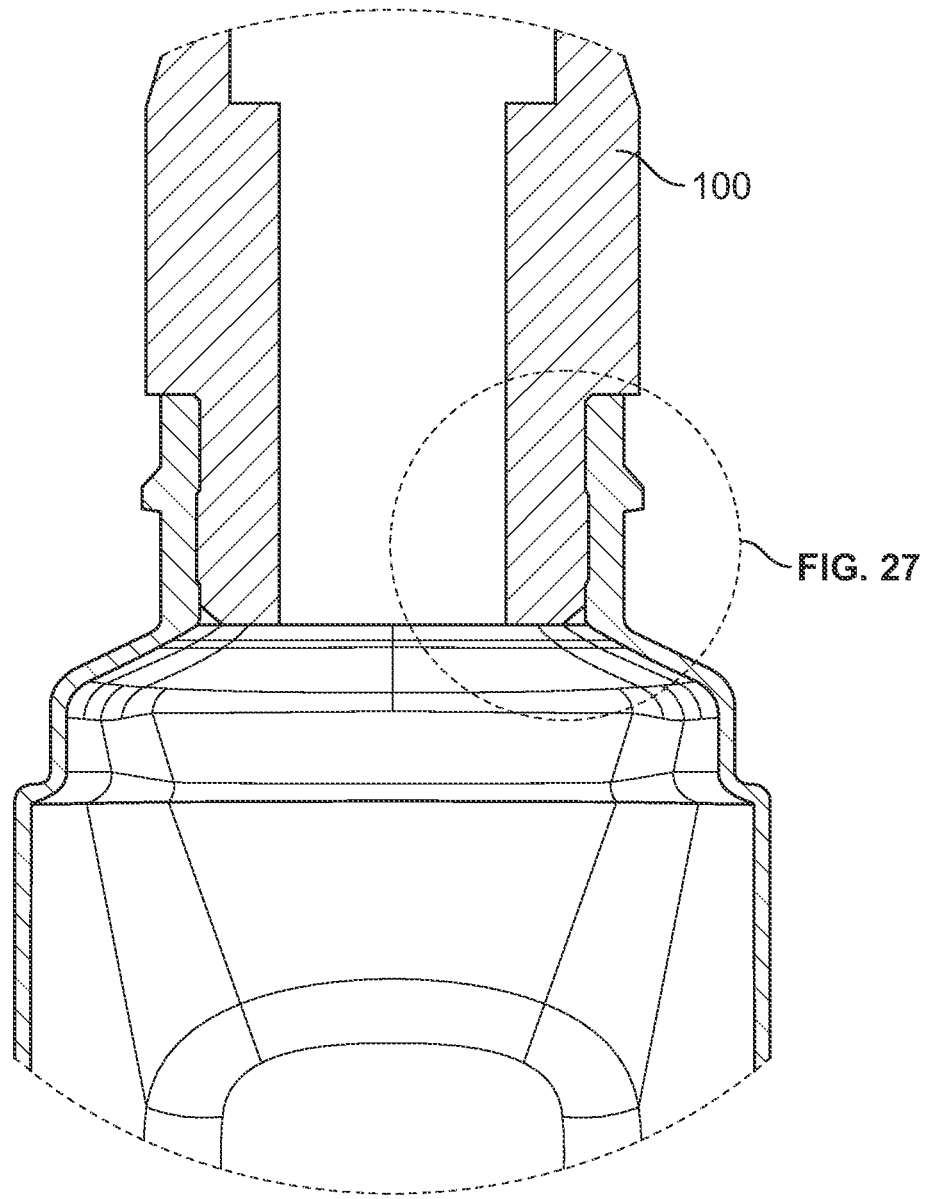
FIG. 26 is a front view of an exemplar blow pin engaged with the neck of a bottle during an extrusion blow molding process.
Figure 27:
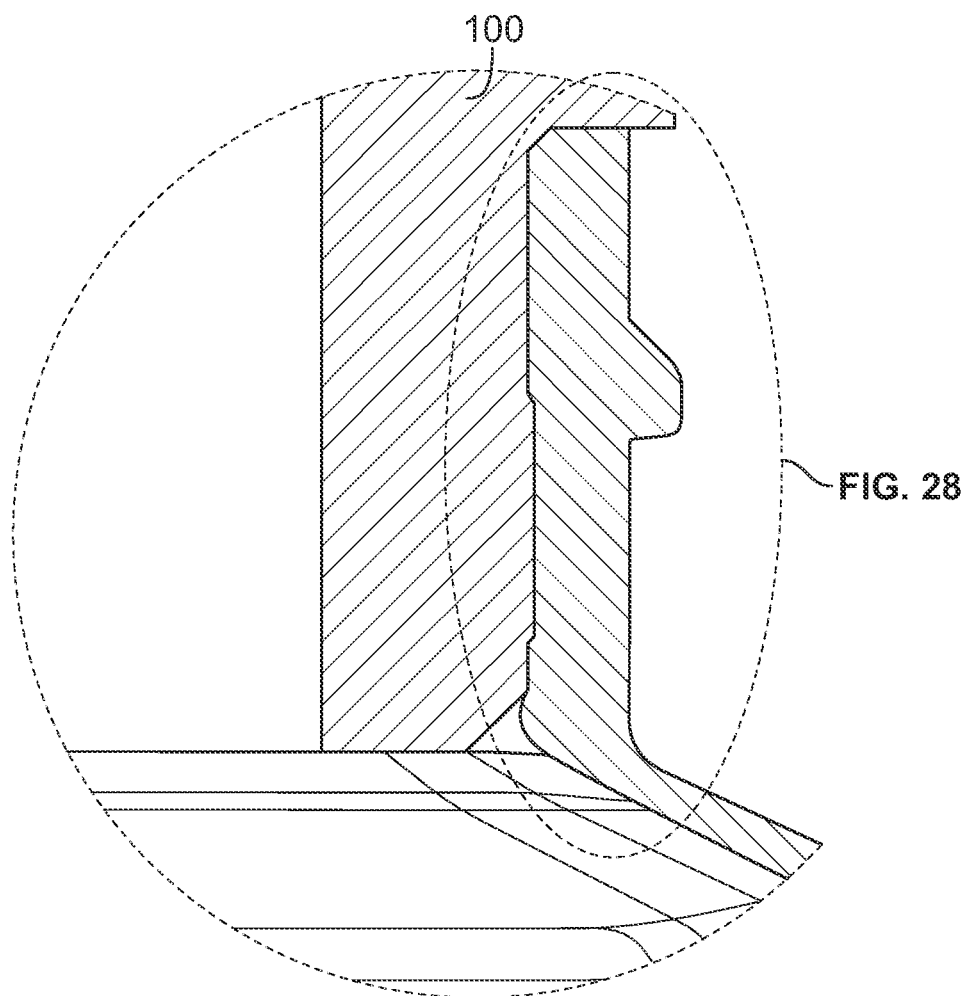
FIG. 27 is a detailed view of the exemplar blow pin engaged with the neck of a bottle during an extrusion blow molding process shown in FIG. 26.
Figure 28:
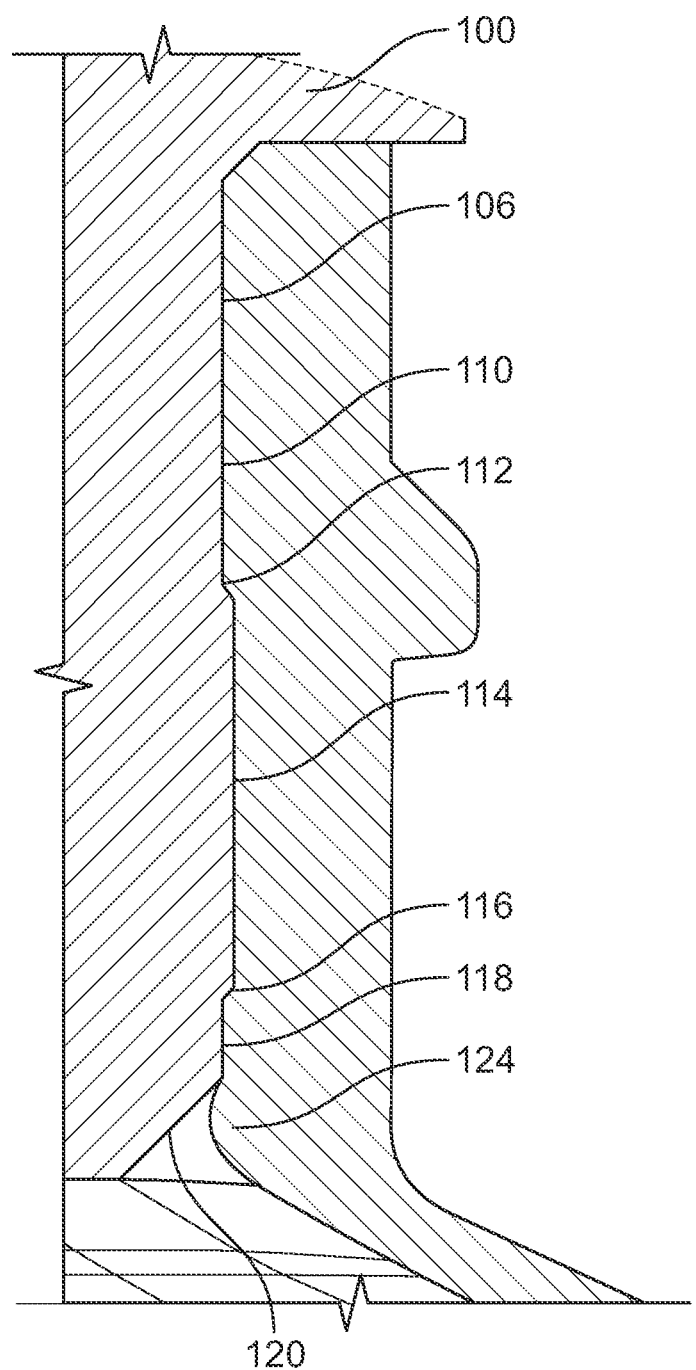
FIG. 28 is a further detailed view of the exemplar blow pin engaged with the neck of a bottle during an extrusion blow molding process shown in FIG. 27.

FIGS. 26-28 illustrate the blow pin 100 of FIG. 24 in use during the extrusion blow molding process. FIG. 27 is a detailed view of the interaction between the various features of the blow pin 100 and the inner surface of the bottle neck during the molding process. FIG. 28 is yet a more detailed view of the interaction between the various features of the blow pin 100 and the inner surface of the bottle neck during the molding process. Although blow pin 100 as illustrated in FIG. 24 is shown as used during the molding processes, it will be appreciated that the blow pin 101 of FIG. 25 or any other blow pins illustrated and/or described herein can be used with such a molding process.

The blow pin 100 can eliminate or reduce the formation of flaws on the inner surface of the neck of a bottle during extrusion blow molding of the bottle. The stepped features of the blow pin 100 (i.e., varying the outer diameter of regions of the blow pin 100) can better control the movement of plastic in the parison during insertion of the blow pin 100 into the parison during the extrusion blow molding process. The stepped features of the blow pin 100 can also result in plastic material from the parison creating a pinch point with the blow pin 100 to block air from escaping between the parison portion that is being formed as the inner surface of the neck and the blow pin 100. Thus, limiting or eliminating the formation of air flow marks in the inner surface of the bottle neck during extrusion blow molding.

As the blow pin 100 is inserted into the parison, the middle region 114 and the second beveled surface 116 engage with the molten plastic of the parison and move stray or uneven portions of the parison downward and away from the area of the parison that will engage with the seal surface region 110 of the blow pin 100, which will be formed into the bottle sealing surface. As will be understood, the blow pin 100 can be inserted into a mold so that the bottom surface 122 of the blow pin 100 is the first portion of the blow pin 100 to engage the parison. The bottom surface 122 of the blow pin 100 can be referred to herein as the distal end of the blow pin 100. Conversely, the opposite end or top surface 127 of the blow pin 100 can be referred to as the proximal end of the blow pin 100. Similarly, for the blow pin 101, as illustrated in FIG. 25, the bottom surface 123 can be referred to as the distal end, and the top surface 129 can be referred to as the proximal end.

Forming a blow pin 100 with a middle region 114 with a larger diameter than the upper region 106 can create a pinch point that blocks the flow of pressurized air between the blow pin 100 and the parison during blow molding because of its larger diameter. The parison is extruded so that the thickness of the wall of the parison is generally uniform. The larger diameter of the middle region 114 allows for less space between that middle region 114 of the blow pin 100 and the surface of the mold cavity. Thus the parison between the middle region 114 and the mold cavity is compressed with a higher force than other portions of the parison. Such a higher force creates a barrier and pinch point to stop pressurized air from finding a flow path past the middle region 114 of the blow pin 100. Thus, the seal surface portion 110, which is used to form the bottle sealing surface is further protected against the formation of flow lines.

Furthermore, as best shown in FIG. 28, as the middle region 114 and the second beveled surface 116 move portions of the parison downward, an excess of plastic 124 builds up at the lower region 118 and at the third beveled surface 120. As the parison is pressurized, the excess plastic 124 is forced against the blow pin 100, for example against the lower region 118 and the third bevel surface 120. The excess plastic 124 can create an additional barrier that blocks pressurized air from moving upwardly between the blow pin 100 and the parison. Thus limiting or eliminating the formation of air flow lines in the inner surface of the bottle neck.

Figure 29:
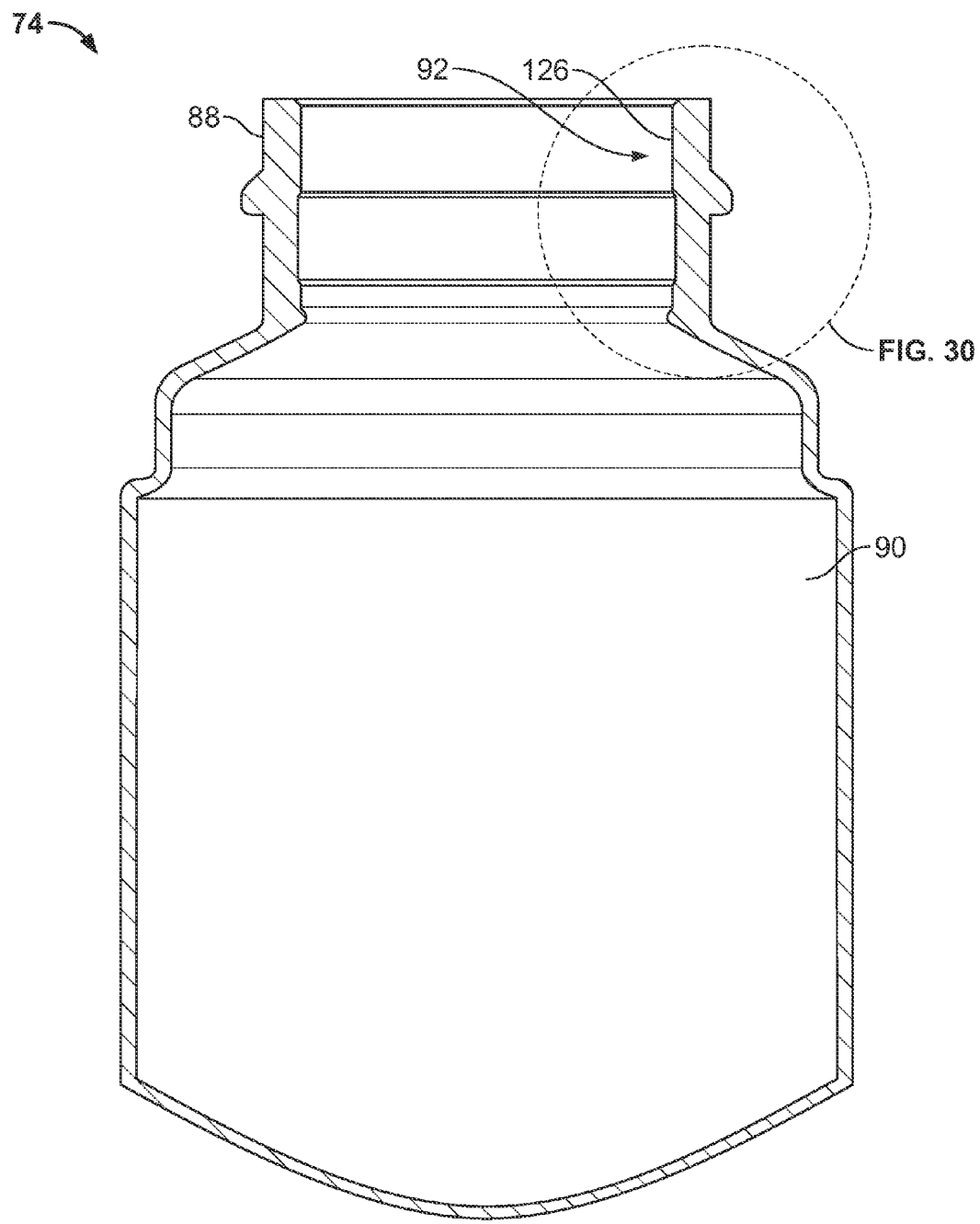
FIG. 29 is a schematic illustration of a cross-section of an exemplary blow molded bottle.
Figure 30:
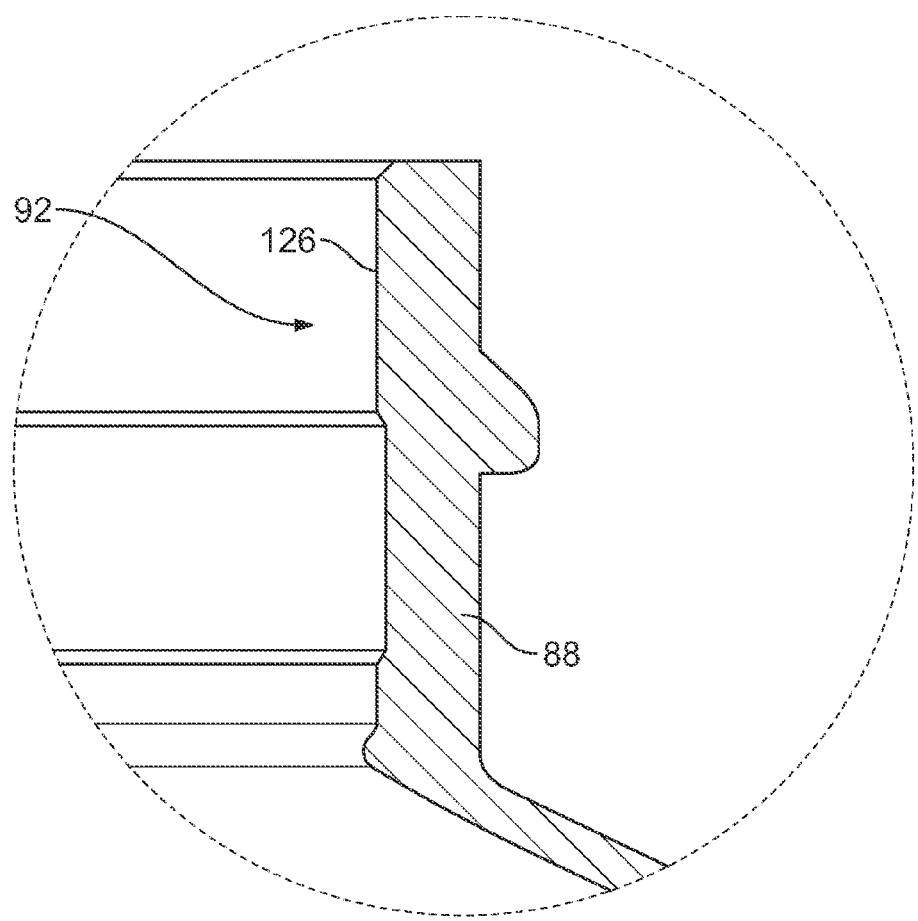
FIG. 30 is a detailed view of the exemplar blow molded bottle illustrated in FIG. 29.

The use of the blow pin 100 as illustrated in FIGS. 26-28 can result in a bottle with a high quality sealing surface on the inner surface of the neck of the bottle that is precise in its dimensions, free from flaws and defects, and repeatable for the mass production of bottles. FIG. 29 schematically illustrates such a bottle in cross-section. FIG. 30 is a detailed view of the neck of the bottle of FIG. 29. As previously discussed, the bottle 74 includes a neck 88 and a body 90. A portion of the inner surface of the neck defines a bottle sealing surface 92, and the bottle sealing surface 92 includes a raised portion 126. In one embodiment, the entire bottle sealing surface 92 is a raised area 126. It will be understood that the use of a stepped blow pin can create a raised area on the inside of the bottle neck that can serve as the sealing area. As will also be understood, when using some embodiments of the blow pins described herein, the raised portion can be formed along the entire circumference of the inner surface of the neck of the bottle. It will also be understood that the various features of blow pins descried herein can be included in a core pin used in injection blow molding to achieve similar results as in extrusion blow molding. The features in a core pin can create a sealing surface along a portion of the inner surface of the bottle neck when the plastic is molten and flowing during injection molding. As with blow pins, a core pin can also form a raised portion along the entire circumference of the inner surface of the neck of the bottle. Upon cooling, the injection blow molded neck of a bottle can include a raised area that serves as a sealing surface area that is free of flaws and defects.

Testing conducted to compare bottles molded with a novel stepped blow pin to bottles molded with prior art straight blow pins demonstrates that molding bottles with a stepped blow pin results in superior seals for bottle assemblies. The tests conducted included testing twenty-four bottle assemblies made with a novel stepped blow pin and twenty-four bottle assemblies made with a prior art blow pin. Each bottle assembly was filled with a liquid (i.e., a liquid water enhancer used to flavor water and comprised primarily of water and concentrated syrups). Each bottle assembly was placed on its side and exposes to a temperature of 120 degrees Fahrenheit and a vacuum of 8 inches of mercury (i.e., 8 inHg) for twenty-four hours. During an inspection of the bottle assemblies after the exposure to the above conditions, it was observed that six of the twenty-four bottle assemblies molded with a prior art blow pin leaked, while none of the twenty-four bottle assemblies molded with a novel stepped blow pin leaked.

As previously discussed, additional methods of achieving a high quality bottle sealing surface include maintaining and replacing a blow pin as needed. For example, a blow pin can be manufactured with precise dimensions and polished to remove any marks or other defects that can occur during the manufacturing of metal components. In one embodiment, a blow pin is polished to an industry standard of surface finish. For example, the surface finish of a blow pin can be polished to a standard of SPI A-3 or higher. In another example, the surface finish of a blow pin can be polished to a standard of SPI A-2 or higher. In addition to manufacturing a blow pin with tight tolerances and to a specified surface finish standard, the blow pin can be inspected from time to time for wear to the surface finish or the blow pin in general and for defects in the blow pin caused by high volume use of the blow pin. If issues are discovered during inspection, the blow pin can be refurbished or otherwise maintained or replaced.

Figure 31:
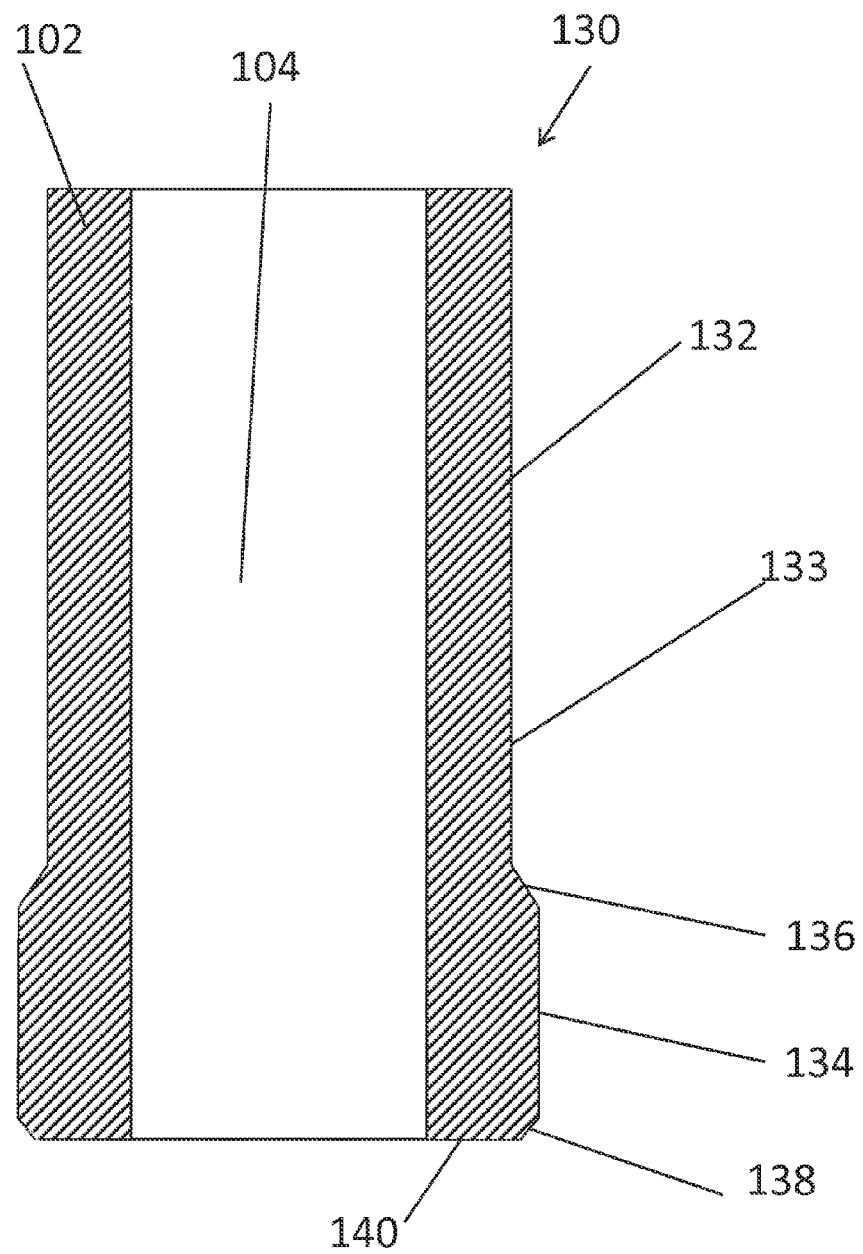
FIG. 31 is a schematic illustration of a cross-section of another exemplary blow pin.

Another embodiment of a blow pin 130 is illustrated in FIG. 31. The blow pin 130 includes a body 102, and an air passage 104 as previously described. However, the blow pin 130 illustrated in FIG. 31 includes two regions—an upper region 132 and a lower region 134. The upper region 132 includes a seal surface portion 133 for forming the sealing surface on the inside of the bottle neck. A first beveled surface 136 transitions the upper region 132 to the lower region 134. A second beveled surface 138 transitions the lower region 134 to the bottom surface 140 of the blow pin 130. The lower region 134 has a larger diameter than the upper region 132. As the blow pin 130 is inserted into a parison, the lower region 134 and the second beveled surface 138 move stray and uneven portions of the parison downward and away from the area of the parison that will engage with the upper region 132 of the blow pin 130. Thus, the seal surface region 133 of the blow pin 130 can be used to form the bottle sealing surface. The larger diameter of the lower region 134 can cause a pinch point that blocks air from traveling between the blow pin 130 and parison as molten plastic is moved downward during insertion of the blow pin 130. Furthermore, any excess plastic material that gathers at the second beveled surface 138 can create an additional barrier against pressurized air flowing between the blow pin 130 and the parison, thus, limiting or eliminating air flow lines in the bottle sealing surface.

Figure 32:
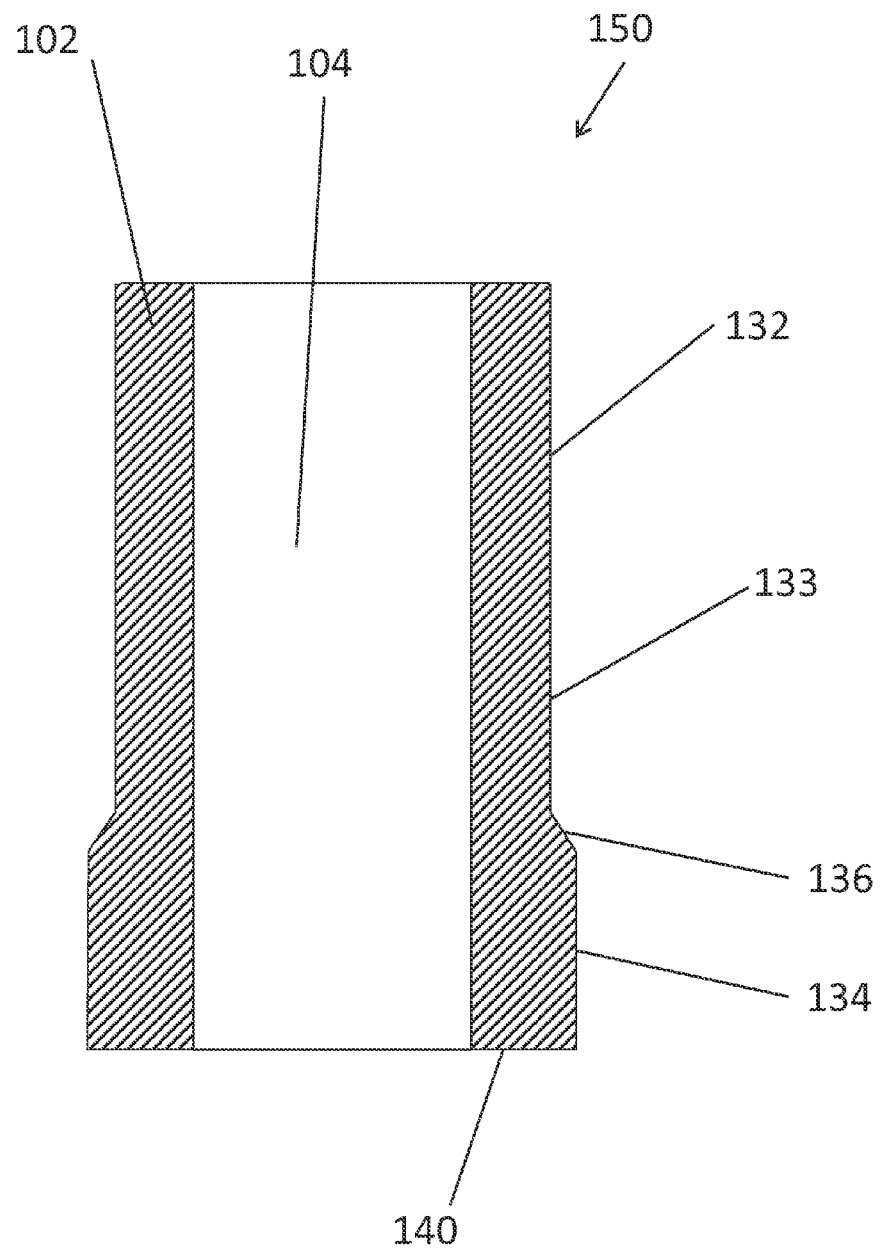
FIG. 32 is a schematic illustration of a cross-section of another exemplary blow pin.

Yet another embodiment of a blow pin 150 is illustrated in FIG. 32. The blow pin 150 is similar to the blow pin 130 illustrated in FIG. 32. The blow pin 150 differs in that the second beveled surface 138 is eliminated. The bottom surface 140 of the blow pin 130 extends directly from the end of the lower region 134. As the blow pin 150 is inserted into a parison, the lower region 134 and the edge created by the intersection of the lower region 134 and the bottom surface 140 move stray and uneven portions of the parison downward and away from the area of the parison that will engage with the upper region 132 of the blow pin 130. Similar to other embodiments, the larger diameter of the lower region 134 can cause a pinch point that blocks air from traveling between the blow pin 150 and parison. As molten plastic is moved downward during insertion of the blow pin 150, excess plastic material can gather along the bottom surface 140 and the edge created with the lower region 134 to create a barrier that blocks pressurized air from flowing between the blow pin 150 and the parison, thus, limiting or eliminating air flow lines in the bottle sealing surface.

The diameters of various regions of the blow pin will be determined by the size of the neck being formed. As described herein, stepped blow pins have at least two regions, one region for forming the bottle sealing surface with a first diameter and a second region positioned below with a second and greater diameter. In one embodiment, the difference in the diameters is between 0.001 inches and 0.030 inches. In another embodiment, the difference in the diameters is between 0.003 inches and 0.010 inches. In one example, the diameter of the first region of the blow pin that forms the bottle sealing surface is 0.586 inches, and the diameter of the second region of the blow pin is 0.594 inches. Thus, the difference in diameters for this example is 0.008 inches. It will be understood that the diameter differences cited herein are exemplary and that other diameter differences can be practiced with the novel methods and apparatus described herein.

Once a bottle is formed by a stepped blow pin, the blow pin can be withdrawn from the bottle using any number of methods. In one method, the blow pin can be removed after the bottle is formed and before the mold is opened to release the bottle. In another method, the mold is opened slightly to allow the bottle neck to flex outwardly to accommodate the increased diameter of a region of the stepped blow pin. In such a method, the mold body can be used to hold the bottle in place as the blow pin is extracted. In another method, the mold can be fully opened to accommodate the removal of the bottle. The blow pin can be removed by a number of mechanical methods such as engaging the bottle with one or more stripper members to hold the bottle in a position as the blow pin is extracted from the bottle. In another method, air pressure provided through the blow pin can be used to eject or otherwise force the bottle off the blow pin.

When designing a blow pin and determining the difference in diameters for various regions of the blow pin, one design consideration is the flexibility or pliability of the neck portion of the formed bottle. Generally, more flexible and pliable necks can provide for larger diameter difference in the regions of the blow pin. It will be understood that the beveled surfaces can assist in the extraction of blow pins from formed bottles.

In addition to the bottle sealing surface, methods can be used to form a high quality sealing surface for the cap. In one example, the sealing surface of the cap can be formed by injection blow molding. The tooling for forming the cap can be manufactured with precise dimensions and polished to remove chatter marks or other defects. In one embodiment, tooling is polished to an industry standard of surface finish. For example, the surface finish of a tooling can be polished to a standard of SPI A-3 or higher. In another example, the surface finish of tooling can be polished to a standard of SPI A-2 or higher. In addition to manufacturing tooling with tight tolerances and to a specified surface finish standard, tooling can be inspected from time to time for wear and roughening of the surface finish. If issues are discovered during inspection, tooling can be refurbished or otherwise maintained or replaced.

In one embodiment, the blow pin can be fabricated in shapes other than cylindrical sections. For example, a blow pin can be fabricated to have oval cross-sections. Similar to the description herein, such blow pins can be stepped blow pins with regions that differ in major and minor diameters to facilitate the formation of a high quality sealing surface on an extrusion blow molded vessel. An oval blow pin can be used to form oval shaped necks and neck openings. An oval shaped blow pin can also be used so that a bottle neck becomes circular upon cooling. When a vessel is designed so that plastic material is not evenly distributed around the neck area, cooling and shrinkage rates can vary based on the amount of plastic material proximate to that portion of the neck. Using an ovalized blow pin can account for disproportional cooling and shrinkage rates around the neck of a bottle such that the neck forms as a generally circular neck upon full shrinkage and cooling.

In one embodiment, the dimensions of the bottle neck and the annular ring of the cap are arranged so that there is an interference fit between the inner diameter of the bottle neck at its sealing surface and the outer diameter of the annular ring at its sealing surface. In one example, the interference fit (i.e., the difference between the inner diameter of the bottle neck at its sealing surface and the outer diameter of the annular ring at its sealing surface) is up to 0.040 inches. In another example, the interference fit is between 0.014 inches and 0.034 inches. In another example, the interference fit is between 0.024 inches and 0.034 inches. In another example, the interference fit is between 0.010 inches and 0.020 inches.

It will be understood that any number of polymers can be used to form a bottle and a cap. In one example, the bottle is formed from polyethylene and the cap is formed from polypropylene. In one embodiment, the bottle is manufactured from a relatively pliable polymer as compared to the cap. In such an embodiment, as the cap is secured to the bottle, the neck can flex to accommodate the insertion of the more rigid ring extension.

In one embodiment, the lengths of the sealing surface sections of the bottle neck and cap can be modified to further guard against leakage. Under certain conditions, using a relatively short sealing surface can minimize the chances that a defect or flaw is present at on the sealing surfaces.

Figure 33:
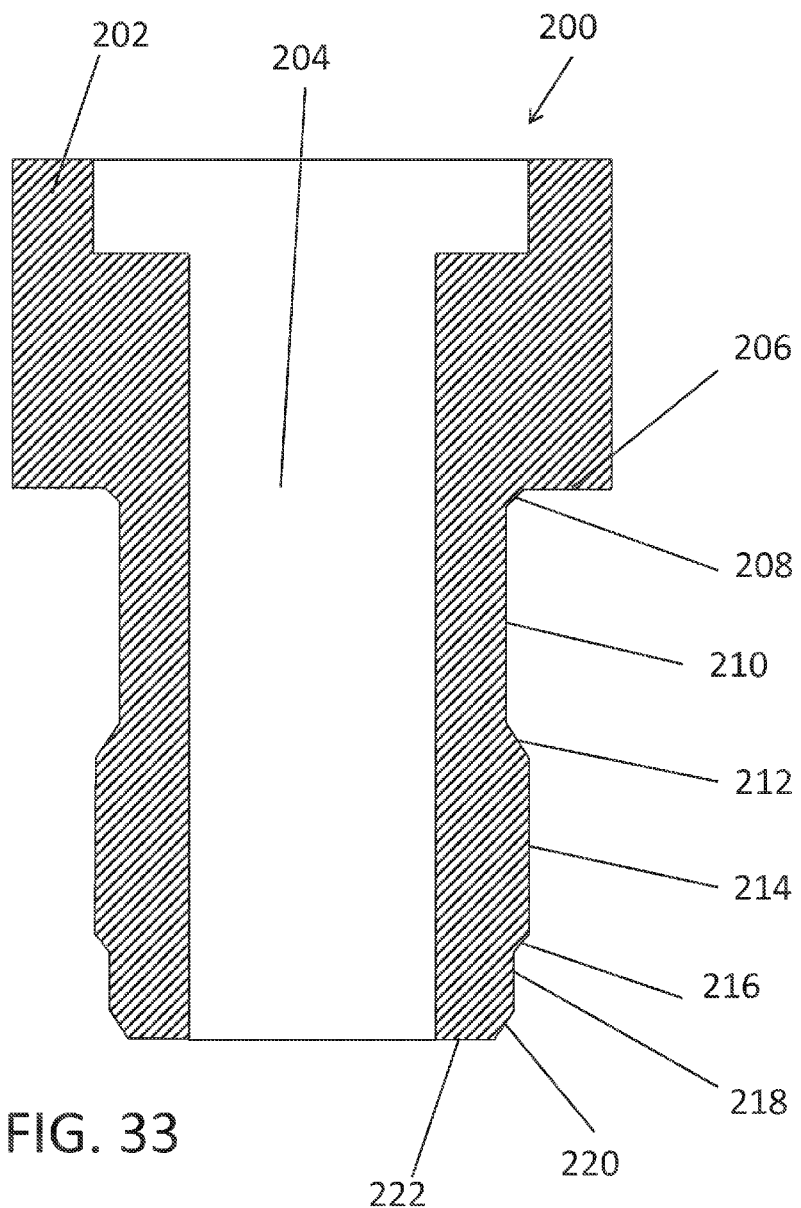
FIG. 33 is a schematic illustration of a cross-section of another exemplary blow pin.
Figure 34:
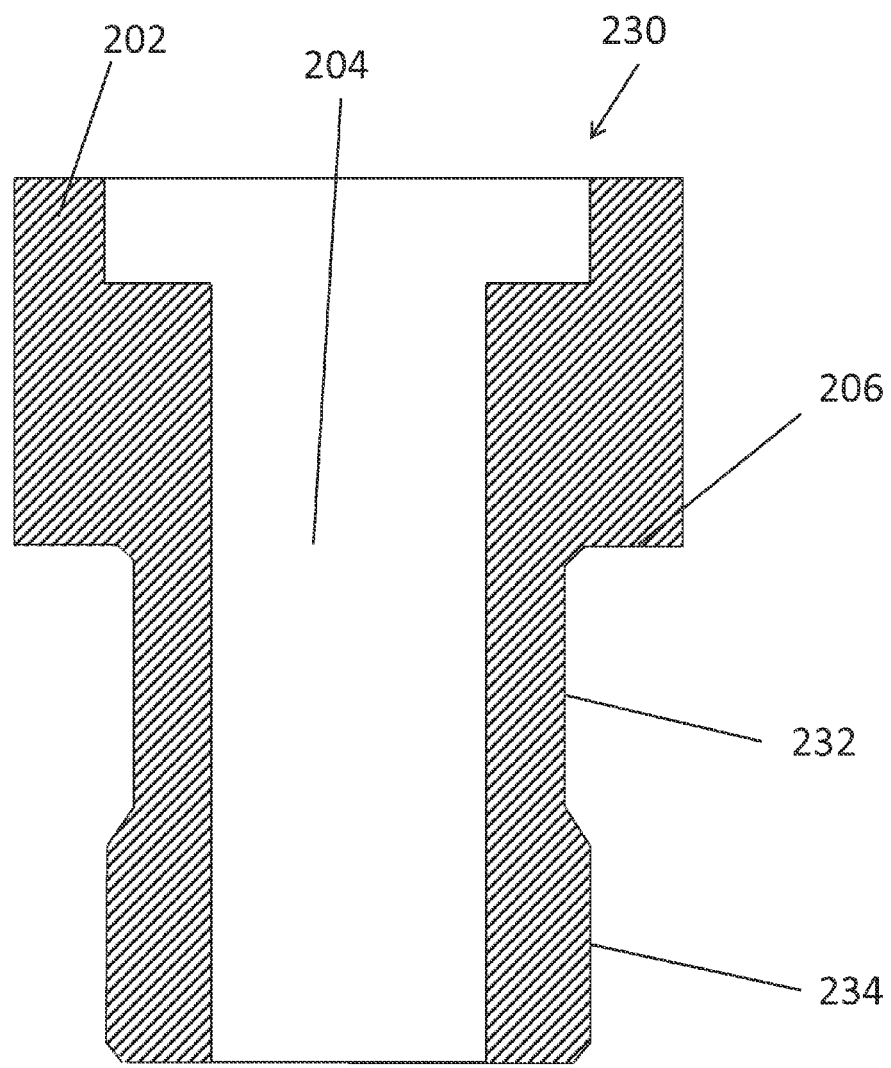
FIG. 34 is a schematic illustration of a cross-section of another exemplary blow pin.
Figure 35:
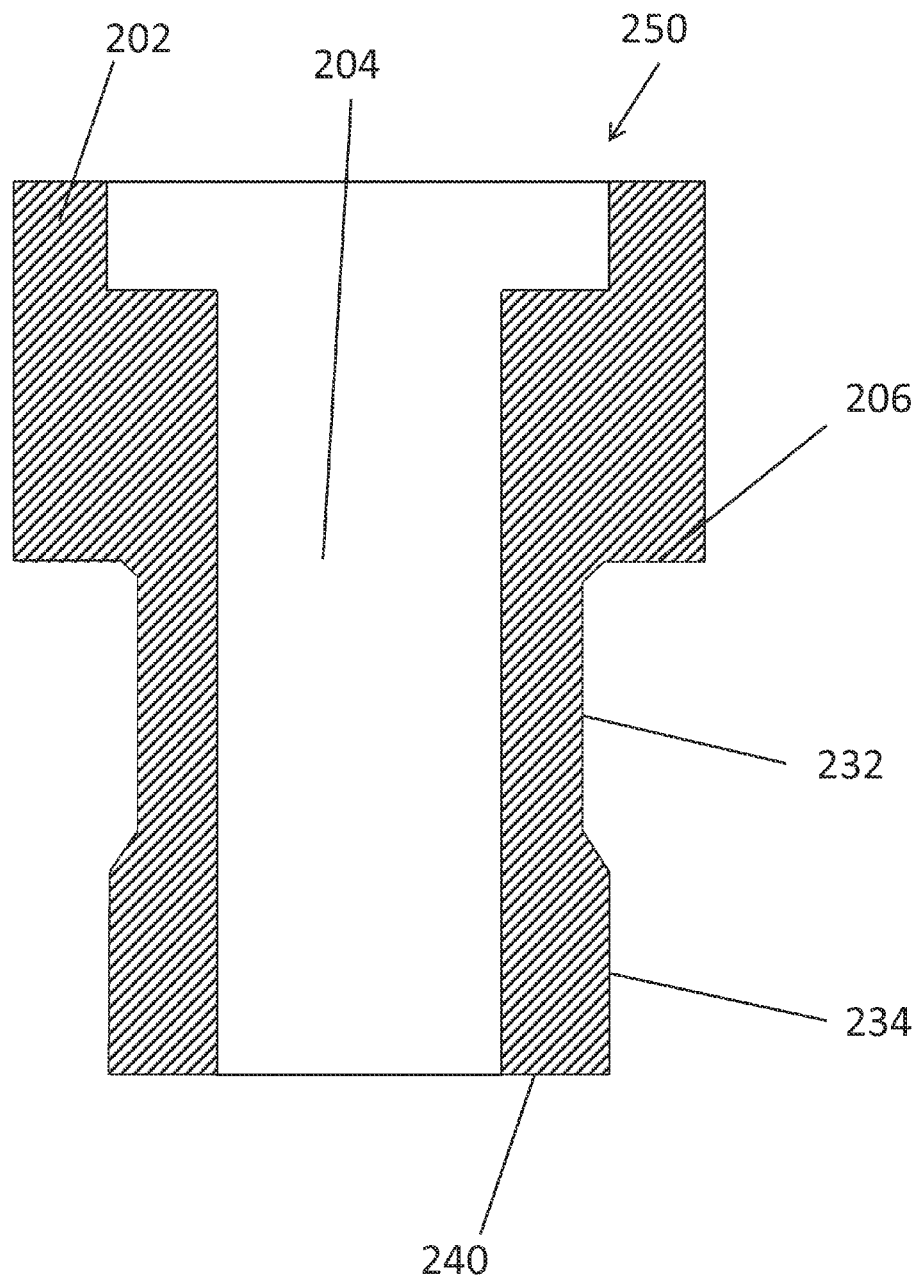
FIG. 35 is a schematic illustration of a cross-section of another exemplary blow pin.
Figure 36:
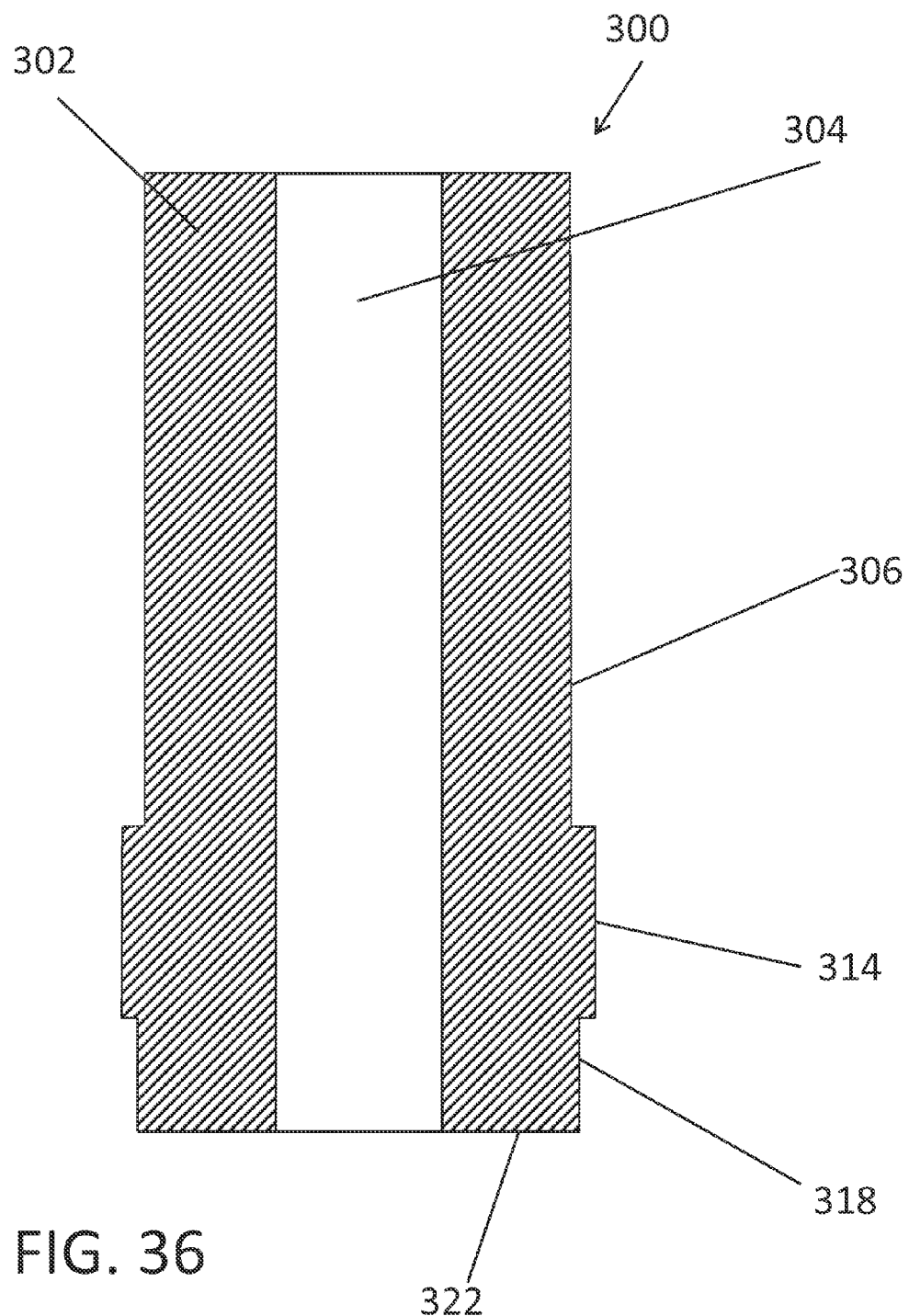
FIG. 36 is a schematic illustration of a cross-section of another exemplary blow pin.

Additional embodiments of novel stepped blow pins for use in extrusion blow molding a bottle is illustrated in cross-section in FIGS. 33-36. In FIG. 33, a blow pin 200 includes a body 202 and an air passage 204 through which air can be injected into a parison. The blow pin 200 includes a shoulder 206 that can define the top surface of the neck of a bottle during the extrusion blow molding process. The blow pin 200 can include a first beveled surface 208 that transitions the shoulder 206 to the remaining portions on the blow pin 200. The first beveled surface 208 can add an angled feature to the top surface of the neck. The blow pin 200 can include a number of regions with differing outer diameters. As shown, below the shoulder 206, the blow pin 200 can include an upper region 210 with a first diameter. The upper region 210 can be used to form the bottle sealing surface portion of the inner surface of the bottle neck that will engage with a cap sealing surface to seal the bottle assembly. Below the upper region 210 is a second beveled surface 212 that transitions the blow pin 200 from the upper region 210 to a middle region 214. The middle region has a second diameter that is greater than the first diameter of the upper region 210. Below the middle region 214 is a third beveled surface 216 that transitions the blow pin 100 from the middle region 214 to a lower region 218. The lower region 218 has a third diameter that is less than the second diameter of the middle region 214. In one embodiment, the first diameter and the third diameter can be generally equal. Finally there is a fourth beveled surface 220 that transitions the blow pin 200 from the lower region 218 to the bottom surface 222 of the blow pin 200.

Another embodiment of a blow pin 230 is illustrated in FIG. 24. The blow pin 230 includes a body 202, an air passage 204, and a shoulder 206 as previously described. However, the blow pin 230 includes only two regions—an upper region 232 and a lower region 234. Another embodiment of a blow pin 250 is illustrated in FIG. 25. The blow pin 250 is similar to the blow pin 230 illustrated in FIG. 24. The blow pin 250 differs in that the bottom surface 240 of the blow pin 250 extends directly from the end of the lower region 234.

In another embodiment illustrated in FIG. 26, a blow pin 300 can include square transitions (i.e., no bevels or chamfers) between regions of the blow pin 300. As shown, the blow pin 300 can include an upper region 306 with a first diameter. A portion of the upper region 306 can be used to form the bottle sealing surface portion of the inner surface of the bottle neck that will engage with a cap sealing surface to seal the bottle assembly. Below the upper region 306, a middle region 314 extends horizontally so that its diameter is greater than the first diameter of the upper region 306. Below the middle region 314 is a lower region 318. The lower region 318 has a smaller diameter than the middle region 314.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

What is claimed is:

1. A method of forming a vessel with a high quality sealing surface using a blow molding process, the method including:
providing a mold that comprises:
a first mold body comprising:
a first cavity;
a first molding surface; and
a first neck forming region; and
a second mold body comprising:
a second cavity;
a second molding surface; and
a second neck forming region;
providing a plastic material;
providing a pin that comprises:
a body with a distal end and a proximal end;
a channel passing through the pin from the distal end to the proximal end;
a first region with a first diameter, the first region including a first engagement surface;
a second region with a second diameter that is greater than the first diameter of the first region, where the second region is positioned between the first region and the distal end;
a first transition positioned between the first region and second region;
a top surface position at the proximal end; and
a bottom surface at the distal end;
positioning the plastic material within the mold;
inserting the pin into the plastic material, where the first engagement surface is positioned proximate to the first neck forming region and second neck forming region;
engaging the plastic material with the first molding surface and second molding surface;
cooling the mold to solidify the plastic material; and
remove the solidified plastic material from the mold.

2. The method of claim 1, where the pin is a blow pin and the blow molding process is an extrusion blow molding process.

3. The method of claim 1, where the pin is a core pin and the blow molding process includes an injection process.

4. The method of claim 1 wherein a portion of the first region with a first diameter is used to form a bottle sealing surface portion of an inner surface of the bottle neck that will engage with a cap sealing surface to seal the bottle assembly.

5. The method of claim 1 further comprising a second transition portion positioned between the second region and the distal end and a third transition portion between a lower region and the bottom surface of the blow pin.

6. The method of claim 5 wherein the first, the second and the third transition portion has a beveled or chamfered or sloped or slanted configuration.

7. The method of claim 1 wherein the difference in the diameters of the first region and the second region is between about 0.001 inches and about 0.030 inches.

8. The method of claim 1 wherein the difference in the diameters of the first region and the second region is between about 0.003 inches and 0.010 inches.

9. The method of claim 1 wherein the diameter of the first region of the blow pin that forms the bottle sealing surface is about 0.586 inches.

10. The method of claim 1 wherein the diameter of the second region of the blow pin that forms the bottle sealing surface is about 0.594 inches.

11. The method of claim 1 wherein the greater diameter of the second region relative to the first region creates a pinch point that blocks the flow of pressurized air between the blow pin and a parison during the blow molding.

* * * * *